United States Patent
Siomina et al.

(10) Patent No.: US 12,355,695 B2
(45) Date of Patent: Jul. 8, 2025

(54) SYSTEMS AND METHODS FOR SRS SWITCHING IMPACT CONTROL

(71) Applicant: TELEFONAKTIEBOLAGET LM ERICSSON (PUBL), Stockholm (SE)

(72) Inventors: Iana Siomina, Täby (SE); Muhammad Ali Kazmi, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 694 days.

(21) Appl. No.: 17/431,039

(22) PCT Filed: Feb. 11, 2020

(86) PCT No.: PCT/IB2020/051102
§ 371 (c)(1),
(2) Date: Aug. 13, 2021

(87) PCT Pub. No.: WO2020/165778
PCT Pub. Date: Aug. 20, 2020

(65) Prior Publication Data
US 2022/0140975 A1    May 5, 2022

Related U.S. Application Data

(60) Provisional application No. 62/805,903, filed on Feb. 14, 2019, provisional application No. 62/806,386, filed on Feb. 15, 2019.

(51) Int. Cl.
*H04L 5/00* (2006.01)
*H04L 27/26* (2006.01)
*H04W 72/542* (2023.01)

(52) U.S. Cl.
CPC ...... *H04L 5/0051* (2013.01); *H04L 27/26025* (2021.01); *H04W 72/542* (2023.01); *H04L 5/001* (2013.01)

(58) Field of Classification Search
CPC ............. H04L 5/0051; H04L 27/26025; H04L 5/001; H04L 5/0098; H04L 5/0053;
(Continued)

(56) References Cited

U.S. PATENT DOCUMENTS 10,455,558 B2 * 10/2019 Rico Alvarino ...... H04W 52/48
11,165,532 B2 * 11/2021 Siomina ............... H04B 17/104
(Continued)

FOREIGN PATENT DOCUMENTS

| CN | 104521273 A | 4/2015 |
| CN | 109076464 A | 12/2018 |
| WO | 2018083631 A1 | 5/2018 |

OTHER PUBLICATIONS

Ericsson, "Impact of slot dropping in SRS switching", 3GPP TSG-RAN WG1 Meeting #86, R1-167483, Göteborg, Sweden, Aug. 2016.
(Continued)

*Primary Examiner* — Brian T O Connor

(57) ABSTRACT

Systems and methods for controlling Sounding Reference Signal (SRS) carrier-based switching impact are disclosed. In some embodiments, a method performed by a wireless device for controlling SRS switching impact comprises determining that there is a SRS carrier-based switching from a first carrier on which a first serving cell of the wireless device operates to a second carrier on which a second serving cell of the wireless device operates. The method further comprises determining an amount of impact that the SRS carrier-based switching has on one or more serving cells of the wireless device and utilizing the amount of impact that the SRS carrier-based switching has on the one or more serving cells of the wireless device. Corresponding embodiments of a wireless device are also disclosed. Embodiments of a method performed by a base station and
(Continued)

corresponding embodiments of a base station are also disclosed.

16 Claims, 13 Drawing Sheets

(58) Field of Classification Search
CPC ...... H04L 1/0026; H04L 1/00; H04W 72/542; H04W 56/0045; H04W 76/25; H04W 76/36; H04W 24/10; H04W 72/12; H04B 17/104; H04B 17/309
See application file for complete search history.

(56) References Cited

U.S. PATENT DOCUMENTS

| | | | |
|---|---|---|---|
| 11,239,982 B2* | 2/2022 | Siomina | H04W 76/36 |
| 11,290,304 B2* | 3/2022 | Rico Alvarino | H04W 72/0446 |
| 11,343,824 B2* | 5/2022 | Rico Alvarino | H04W 72/0453 |
| 11,387,958 B2* | 7/2022 | Papasakellariou | H04L 5/0053 |
| 11,438,916 B2* | 9/2022 | Rico Alvarino | H04L 5/0051 |
| 11,476,989 B2* | 10/2022 | Liu | H04L 27/261 |
| 11,540,227 B2* | 12/2022 | MolavianJazi | H04W 72/21 |
| 11,764,930 B2* | 9/2023 | Papasakellariou | H04B 7/04 370/329 |
| 11,889,457 B2* | 1/2024 | Siomina | H04L 5/0092 |
| 2012/0083278 A1* | 4/2012 | Kazmi | H04W 36/06 455/450 |
| 2015/0011236 A1* | 1/2015 | Kazmi | H04W 52/365 455/456.1 |
| 2017/0302419 A1* | 10/2017 | Liu | H04L 5/0078 |
| 2022/0329369 A1* | 10/2022 | Papasakellariou | H04W 52/242 |

OTHER PUBLICATIONS

Ericsson, "On RRM requirements impacts with SRS carrier based switching", 3GPP TSG RAN WG4 Meeting #80-bis, R4-168026, Ljubljana, Slovenia, Oct. 10-14, 2016.

* cited by examiner

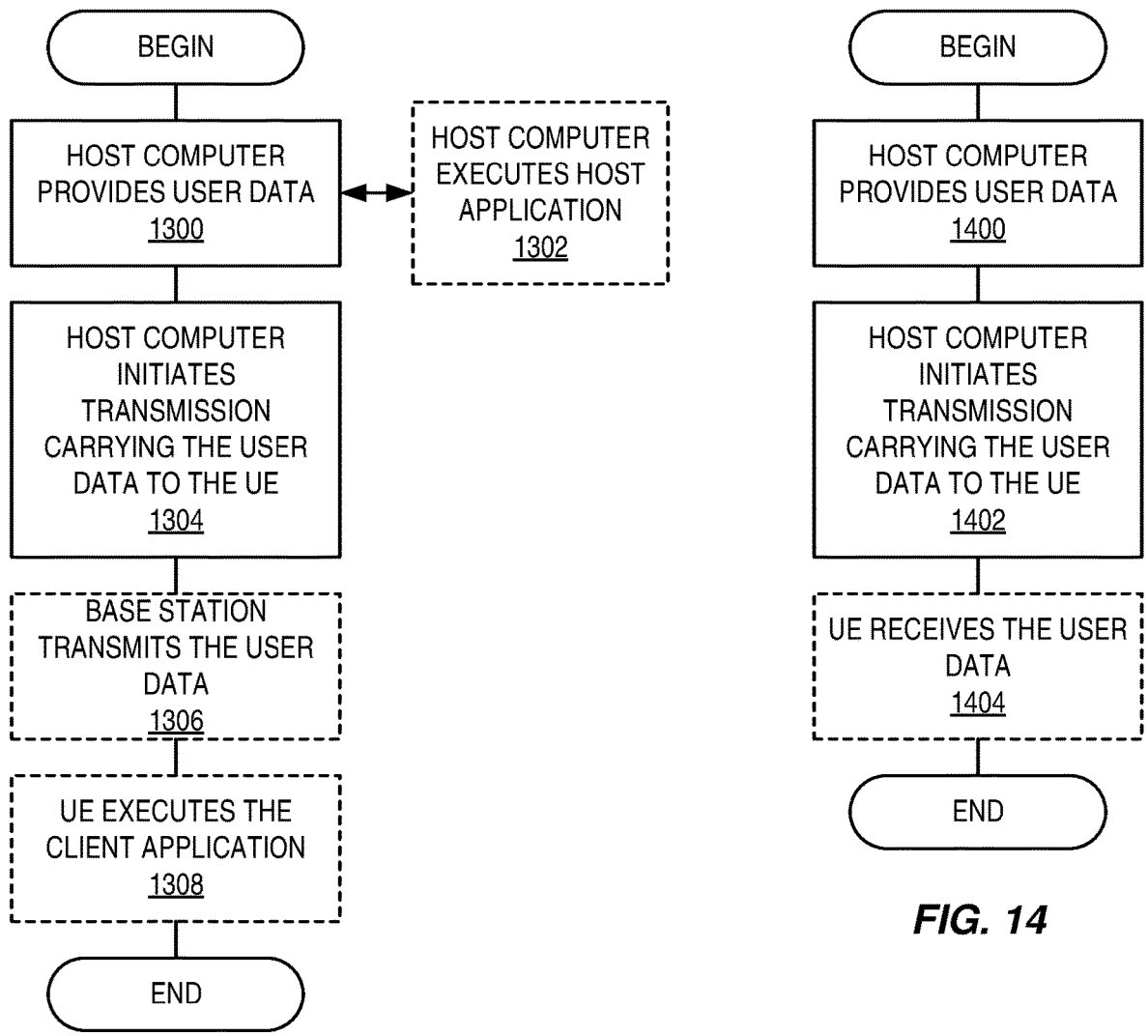

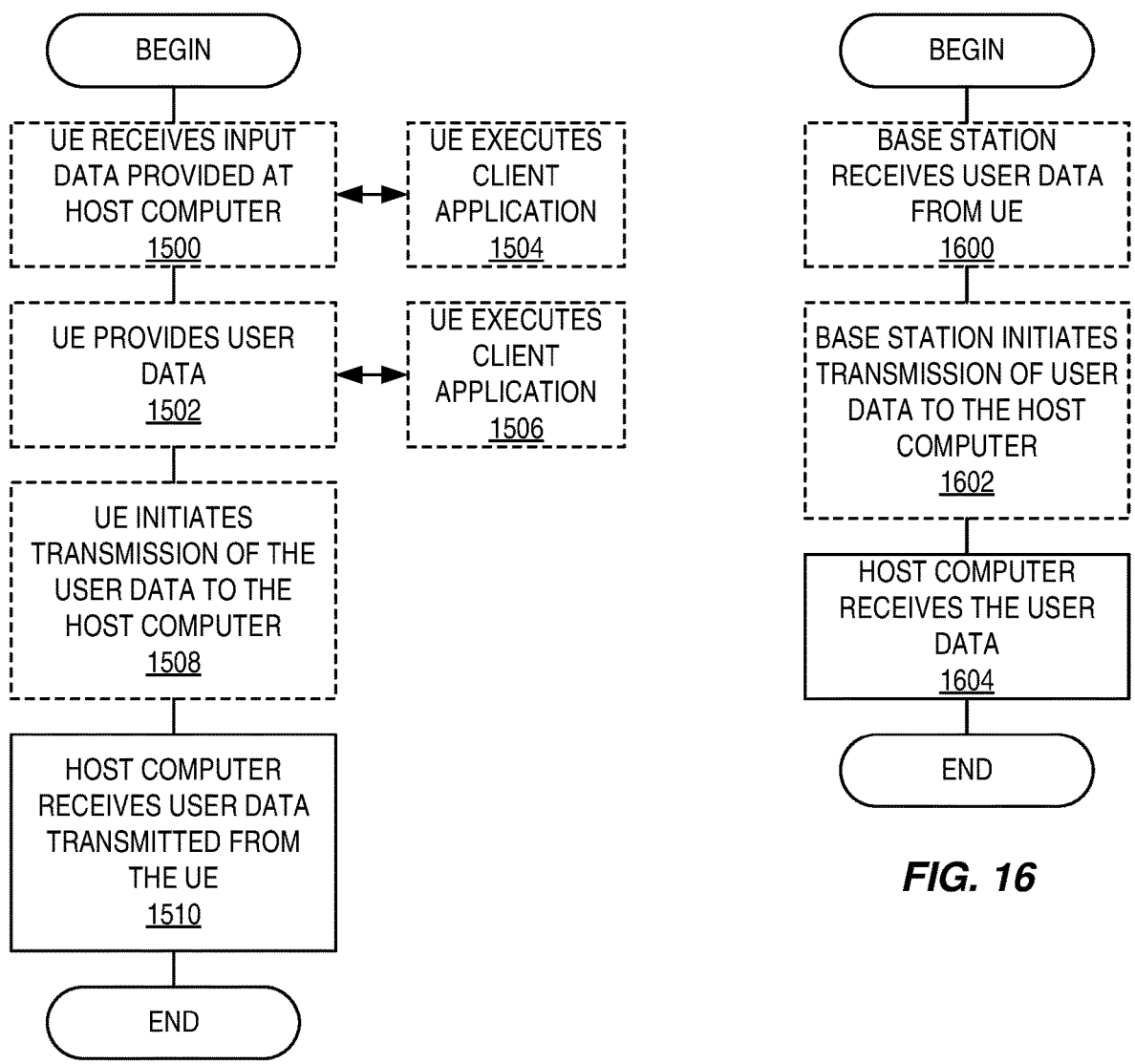

SYSTEMS AND METHODS FOR SRS SWITCHING IMPACT CONTROL

RELATED APPLICATIONS

This application is a national stage application of International Patent Application No. PCT/IB2020/051102, filed Feb. 11, 2020, which claims the benefit of U.S. Provisional Patent Application No. 62/805,903, filed Feb. 14, 2019, and U.S. Provisional Patent Application No. 62/806,386, filed Feb. 15, 2019, the disclosures of which are hereby incorporated herein by reference in their entireties.

TECHNICAL FIELD

The present disclosure relates to Sounding Reference Signal (SRS) carrier-based switching in a cellular communications system.

BACKGROUND

Sounding Reference Signal (SRS) Switching in Long Term Evolution (LTE)

In LTE networks, there are many kinds of downlink (DL) heavy traffic, which leads to a larger number of aggregated downlink Component Carriers (CCs) than the number of (aggregated) uplink (UL) CCs. For the existing User Equipment (UE) categories, the typical Carrier Aggregation (CA) capable UEs only support one or two uplink CCs, while up to five CCs can be aggregated in DL in the Third Generation Partnership Project (3GPP) Release 14 (Rel-14) timeframe. A larger number of CCs will be supported in future 3GPP releases.

SRS carrier-based switching aims to support SRS switching to and between Time Division Duplexing (TDD) CCs, where the CCs available for SRS (or Physical Random Access Channel (PRACH)) transmission correspond to the CCs available for CA of Physical Downlink Shared Channel (PDSCH), while the UE has fewer CCs available for CA of Physical Uplink Shared Channel (PUSCH).

SRS carrier-based switching is applicable to at least the following CA scenarios (e.g., radio conditions):
- both TDD-TDD and Frequency Division Duplexing (FDD)-TDD CA scenarios are included for SRS carrier-based switching, and
- both inter-band and intra-band cases and mixtures of these two cases for TDD-TDD and FDD-TDD can be considered for SRS carrier-based switching.

Some of the TDD carriers with DL transmission for the UE will have no UL transmission including SRS, and channel reciprocity cannot be utilized for these carriers. Such situations will become more severe with CA enhancement of up to thirty-two (32) CCs where a large portion of CCs might be TDD. Allowing fast carrier switching to and between TDD UL carriers can be a solution to allow SRS transmission on these TDD carriers so that corresponding reciprocity benefits can be harvested in DL.

Thus, SRS carrier-based switching herein means that during certain time resources (e.g., based on one or more radio conditions sensed by the UE or otherwise) the UE does not transmit any signal on one carrier (e.g., F1) while it transmits UL reference signals (e.g., SRS) on another carrier (e.g., F2). To perform SRS switching, the UE uses the radio circuitry (e.g., transmitter chain) of one carrier in order to transmit SRS on a cell of another carrier. This operation may cause interruption on one or more cells serving the UE. As an example, F1 and F2 can be Primary Cell (PCell) and Secondary Cell (SCell) respectively, or both of them can be SCells.

FIG. 1 illustrates an example of an SRS carrier-based switching procedure in LTE. The interruption on the Primary Component Carrier (PCC) and each of the activated Secondary Component Carriers (SCCs) during the switching to the PUSCH-less SCC shall not exceed two subframes including the first subframe where SRS transmission is configured on the PUSCH-less SCC. The interruption on PCC and each of the activated SCCs during the switching from the PUSCH-less SCC shall not exceed two subframes including the last subframe where SRS transmission is configured on the PUSCH-less SCC.

SRS Switching in New Radio (NR)

SRS switching in NR is based on similar principles to SRS switching in LTE.

Radio Access Network (RAN) working group 2 (RAN2) in 3GPP agreed to define the SRS carrier switching capability for NR as in LTE. For a given band combination, the UE reports the pairs of bands for which SRS carrier switching is supported. For each pair of bands, maximum interruption time is reported. By doing this, the capability signaling is supposed to accommodate all the values as listed below:
- intra-band CA: 0 microseconds (μs), 30 μs, 100 μs, 140 μs, and 200 μs; and
- inter-band CA: 0 μs, 30 μs, 100 μs, 200 μs, 300 μs, 500 μs, and 900 μs.

So, the reportable values are: 0, 30, 100, 140, 200, 300, 500, and 900. For each band pair, the interruption time is reported for DL and UL, respectively (3 bits×2).

Subcarrier Spacing (SCS) and Subframe/Slot Structure in LTE and NR

In LTE, subcarrier spacing of 15 kilohertz (kHz) has been assumed during the SRS switching studies, and the minimum Transmission Time Interval (TTI) in LTE is one subframe (e.g., 1 millisecond (ms) long) which always comprises two slots. Therefore, a radio frame contains 10 subframes or 20 slots.

In NR, SCS is flexible and needs to be taken into account. Multiple Orthogonal Frequency Division Multiplexing (OFDM) numerologies are supported as given by Table 1 below, where μ and the cyclic prefix for a bandwidth part are obtained from the higher-layer parameters subcarrierSpacing and cyclicPrefix, respectively. The supported numerology is also dependent on the frequency range, e.g. SCS of 15 kHz, 30 kHz, and 60 kHz are used in Frequency Range 1 (FR1), which is from 450 Megahertz (MHz) and up to 6 Gigahertz (GHz), while SCS of 60 kHz, 120 kHz, and 240 kHz are used in Frequency Range 2 (FR2), which is from 24 GHz and up to 52.6 GHz. 60 kHz may be used for control and data transmissions but not for Synchronization Signal Block (SSB) transmissions in FR2, while 240 kHz may be used for SSB transmissions but not for control or data transmissions. 60 kHz is also optional for the UE in FR1.

TABLE 1

Supported transmission numerologies in NR Rel-15

| μ | $\Delta f = 2^\mu \cdot 15$ [kHz] | Cyclic prefix |
|---|---|---|
| 0 | 15 | Normal |
| 1 | 30 | Normal |

TABLE 1-continued

Supported transmission numerologies in NR Rel-15

| μ | $\Delta f = 2^\mu \cdot 15$ [kHz] | Cyclic prefix |
|---|---|---|
| 2 | 60 | Normal, Extended |
| 3 | 120 | Normal |
| 4 | 240 | Normal |

The numerology in NR also has impact on the radio frame structure, as illustrated in Table 2 below. For example, the number of slots per radio frame may be different depending on the numerology. The minimum TTI in NR is one slot.

TABLE 2

Number of OFDM symbols per slot, slots per frame, and slots per subframe for normal cyclic prefix

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

SUMMARY

Systems and methods for controlling an impact of Sounding Reference Signal (SRS) carrier-based switching are disclosed. Embodiments of a method performed by a wireless device and corresponding embodiments of a wireless device are disclosed. In some embodiments, a method performed by a wireless device for controlling SRS switching impact comprises determining that there is a SRS carrier-based switching from a first carrier on which a first serving cell of the wireless device operates to a second carrier on which a second serving cell of the wireless device operates. The method further comprises determining an amount of impact that the SRS carrier-based switching from the first carrier on which the first serving cell of the wireless device operates to the second carrier on which the second serving cell of the wireless device operates has on one or more serving cells of the wireless device. The method further comprises utilizing the amount of impact that the SRS carrier-based switching has on the one or more serving cells of the wireless device. By determining the amount of impact, the wireless device may compensate for SRS carrier-based switching impact.

In some embodiments, the first serving cell of the wireless device is one of two or more cells in a first cell group of the wireless device, the second serving cell of the wireless device is one of two or more cells in a second cell group of the wireless device, and the one or more serving cells of the wireless device comprise at least one of the two or more cells in the first cell group of the wireless device, other than the first serving cell, and/or at least one of the two or more cells in the second cell group of the wireless device, other than the second serving cell.

In some embodiments, at least one of the first carrier and the second carrier has a flexible subcarrier spacing.

In some embodiments, utilizing the amount of impact that the SRS carrier-based switching has on the one or more serving cells of the wireless device comprises performing a first action when the amount of impact is below a threshold and performing a second action when the amount of impact is not below the threshold.

In some embodiments, utilizing the amount of impact that the SRS carrier-based switching has on the one or more serving cells of the wireless device comprises utilizing the amount of impact to: (I) determine an applicable radio resource management requirement that the wireless device is required to meet, (II) determine a performance of the wireless device when the wireless device performs SRS carrier-based switching, (III) compensate for the amount of impact, (IV) adapt operation of the wireless device to reduce the amount of impact of SRS carrier-based switching on performance of the wireless device, (V) schedule one or more operational tasks of the wireless device to reduce an overlap between the one or more operational tasks and a time of interruption due to the amount of impact, or (VI) any combination two or more of I-V.

In some embodiments, utilizing the amount of impact that the SRS carrier-based switching has on the one or more serving cells of the wireless device comprises compensating for the amount of impact. In some embodiments, compensating for the amount of impact comprises: (A) delaying a time for one or more operational tasks performed by the wireless device, (B) extending a time used by the wireless device to perform one or more operational tasks, (C) both A and B.

In some embodiments, the amount of impact comprises one or more interruption related parameters or metrics. In some embodiments, the one or more interruption related parameters or metrics comprise: (a) a duration of an interruption on the one or more serving cells as a result of the SRS carrier-based switching, (b) an error rate on the one or more serving cells as a result of the SRS carrier-based switching, (c) a number of lost packets on the one or more serving cells as a result of the SRS carrier-based switching, (d) a packet loss rate on the one or more serving cells as a result of the SRS carrier-based switching, (e) a packet drop rate on the one or more serving cells as a result of the SRS carrier-based switching, (f) a reduction in detection probability for packets on the one or more serving cells as a result of the SRS carrier-based switching, (g) an increase of misdetection probability for one of the one or more serving cells as a result of the SRS carrier-based switching, (h) a probability of packets missed, dropped, or lost on the one or more serving cells as a result of the SRS carrier-based switching, or (i) any combination of two or more of a-h.

In some embodiments, determining an amount of impact that the SRS carrier-based switching from the first carrier on which the first serving cell of the wireless device operates to the second carrier on which the second serving cell of the wireless device operates has on one or more serving cells of the wireless device comprises determining the amount of impact based on: (i) a frequency separation between the first carrier and the second carrier, (ii) a first numerology of the first carrier, (iii) a second numerology of the second carrier, (iv) a timing alignment between the first carrier and the second carrier, (v) a first radio access technology of the first carrier, (vi) a second radio access technology of the second carrier, (vii) any combination of two more of i-vi.

In some embodiments, a wireless device for controlling SRS switching impact is adapted to determine that there is a SRS carrier-based switching from a first carrier on which a first serving cell of the wireless device operates to a second carrier on which a second serving cell of the wireless device operates. The wireless device is further adapted to determine an amount of impact that the SRS carrier-based switching from the first carrier on which the first serving cell of the wireless device operates to the second carrier on which the second serving cell of the wireless device operates has on one or more serving cells of the wireless device. The wireless device is further adapted to utilize the amount of impact that the SRS carrier-based switching has on the one or more serving cells of the wireless device.

In some embodiments, the wireless device comprises one or more transmitters, one or more receivers, and processing circuitry associated with the one or more transmitters and the one or more receivers. The processing circuitry is configured to cause the wireless device to determine that there is a SRS carrier-based switching from the first carrier on which the first serving cell of the wireless device operates to the second carrier on which the second serving cell of the wireless device operates, determine the amount of impact that the SRS carrier-based switching from the first carrier on which the first serving cell of the wireless device operates to the second carrier on which the second serving cell of the wireless device operates has on the one or more serving cells of the wireless device, and utilize the amount of impact that the SRS carrier-based switching has on the one or more serving cells of the wireless device.

Embodiments of a method performed by a base station for controlling SRS switching impact and corresponding embodiments of a base station are also disclosed. In some embodiments, a method performed by a base station for controlling SRS switching impact comprises determining that there is a SRS carrier-based switching from a first carrier on which a first serving cell of a wireless device operates to a second carrier on which a second serving cell of the wireless device operates. The method further comprises determining an amount of impact that the SRS carrier-based switching from the first carrier on which the first serving cell of the wireless device operates to the second carrier on which the second serving cell of the wireless device operates has on one or more serving cells of the wireless device. The method further comprises utilizing the amount of impact that the SRS carrier-based switching has on the one or more serving cells of the wireless device.

In some embodiments, the first serving cell of the wireless device is one of two or more cells in a first cell group of the wireless device, the second serving cell of the wireless device is one of two or more cells in a second cell group of the wireless device, and the one or more serving cells of the wireless device comprise at least one of the two or more cells in the first cell group of the wireless device, other than the first serving cell, and/or at least one of the two or more cells in the second cell group of the wireless device, other than the second serving cell.

In some embodiments, at least one of the first carrier and the second carrier has a flexible subcarrier spacing.

In some embodiments, determining the amount of impact that the SRS carrier-based switching from the first carrier on which the first serving cell of the wireless device operates to the second carrier on which the second serving cell of the wireless device operates has on one or more serving cells of the wireless device comprises receiving an indication of the amount of impact from the wireless device.

In some embodiments, utilizing the amount of impact that the SRS carrier-based switching has on the one or more serving cells of the wireless device comprises utilizing the amount of impact to: (I) determine performance of the wireless device when the wireless device is performing SRS carrier-based switching, (II) compensate for the determined impact, (III) adapt a configuration or scheduling for the wireless device to reduce the amount of impact of SRS carrier-based switching on a performance of the wireless device, (IV) schedule one or more operational tasks of the base station to reduce an overlap between the one or more operational tasks and a time of interruption that results from the SRS carrier-based switching, (V) take a first action when the determined amount of impact is below a threshold, (VI) take a second action when the determined amount of impact is above a threshold, (VII) adapt a configuration or a configuration of signals to be used by the wireless device so that the determined amount of impact is below a threshold when the wireless device is configured with SRS carrier-based switching, (VIII) select an SRS switching configuration for which the determined amount of impact is below a threshold, (IX) configure two SRS switching loops with a larger overlap, or (X) any combination of two or more of I-IX.

In some embodiments, the amount of impact comprises one or more interruption related parameters or metrics. In some embodiments, the one or more interruption related parameters or metrics comprise: (a) a duration of an interruption on the one or more serving cells as a result of the SRS carrier-based switching, (b) an error rate on the one or more serving cells as a result of the SRS carrier-based switching, (c) a number of lost packets on the one or more serving cells as a result of the SRS carrier-based switching, (d) a packet loss rate on the one or more serving cells as a result of the SRS carrier-based switching, (e) a packet drop rate on the one or more serving cells as a result of the SRS carrier-based switching, (f) a reduction in detection probability for packets on the one or more serving cells as a result of the SRS carrier-based switching, (g) an increase of misdetection probability for one of the one or more serving cells as a result of the SRS carrier-based switching, (h) a probability of packets missed, dropped, or lost on the one or more serving cells as a result of the SRS carrier-based switching, (i) any combination of two or more of a-h.

In some embodiments, determining the amount of impact that the SRS carrier-based switching from the first carrier on which the first serving cell of the wireless device operates to the second carrier on which the second serving cell of the wireless device operates has on one or more serving cells of the wireless device comprises determining the amount of impact based on: (i) a frequency separation between the first carrier and the second carrier, (ii) a first numerology of the first carrier, (iii) a second numerology of the second carrier, (iv) a timing alignment between the first carrier and the second carrier, (v) a first radio access technology of the first carrier, (vi) a second radio access technology of the second carrier, or (vii) any combination of two more of i-vi.

In some embodiments, a base station for controlling SRS switching impact is adapted to determine that there is a SRS carrier-based switching from a first carrier on which a first serving cell of the wireless device operates to a second carrier on which a second serving cell of the wireless device operates, determine an amount of impact that the SRS carrier-based switching from the first carrier on which the first serving cell of the wireless device operates to the second carrier on which the second serving cell of the wireless device operates has on one or more serving cells of the wireless device, and utilize the amount of impact that the SRS carrier-based switching has on the one or more serving cells of the wireless device.

In some embodiments, the base station comprises processing circuitry configured to cause the base station to determine that there is a SRS carrier-based switching from the first carrier on which the first serving cell of a wireless device operates to the second carrier on which the second serving cell of the wireless device operates, determine the amount of impact that the SRS carrier-based switching from the first carrier on which the first serving cell of the wireless device operates to the second carrier on which the second serving cell of the wireless device operates has on one or more serving cells of the wireless device, and utilize the amount of impact that the SRS carrier-based switching has on the one or more serving cells of the wireless device.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 13 through 16 are flowcharts illustrating methods implemented in a communication system, in accordance with some embodiments of the present disclosure;

DETAILED DESCRIPTION

Figure 1:
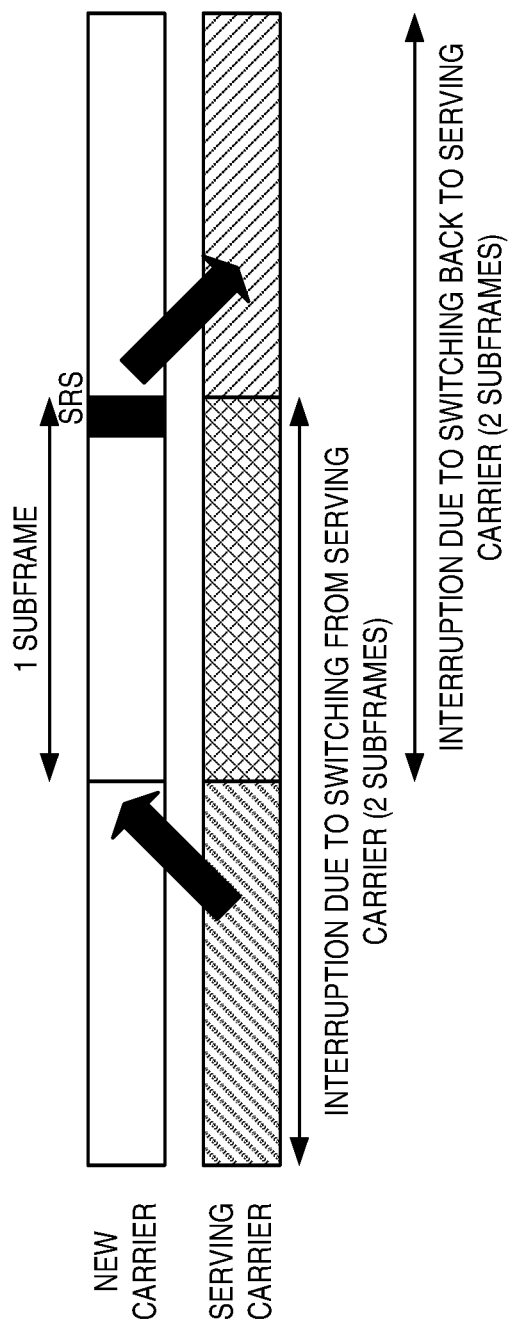
FIG. 1 illustrates an example of a Sounding Reference Signal (SRS) carrier-based switching procedure in Long Term Evolution (LTE)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device. In some embodiments the non-limiting term UE is used and it refers to any type of wireless device communicating with a network node and/or with another UE in a cellular or mobile communication system. Examples of UE are target device, Device-to-Device (D2D) UE, machine type UE or UE capable of Machine-to-Machine (M2M) communication, Personal Digital Assistant (PDA), iPad, tablet, mobile terminals, smart phone, Laptop Embedded Equipment (LEE), Laptop Mounted Equipment (LME), drone, Universal Serial Bus (USB) dongles, Proximity Service (ProSe) UE, Vehicle-to-Vehicle (V2V) UE, Vehicle-to-Everything (V2X) UE, etc.

Network Node: As used herein, a "network node" is any node that is either part of the RAN or the core network of a cellular communications network/system. A network node can correspond to any type of radio network node or any network node, which communicates with a UE and/or with another network node. Examples of network nodes are radio network node, gNB, next generation eNB (ng-eNB), Base Station (BS), NR base station, Transmission Reception Point (TRP), Multi-Standard Radio (MSR) radio node such as MSR BS, network controller, Radio Network Controller (RNC), Base Station Controller (BSC), relay, Access Point (AP), transmission points, transmission nodes, Remote Radio Unit (RRU), Remote Radio Head (RRH), nodes in a Distributed Antenna System (DAS), core network node (e.g., Mobile Switching Center (MSC), MME, etc.), Operation and Maintenance (O&M), Operations Support System (OSS), Self-Organizing Network (SON), positioning node or location server (e.g., Evolved Serving Mobile Location Center (E-SMLC)), Minimization of Drive Tests (MDT), test equipment (physical node or software), etc.

Time Resource: The term time resource used herein may correspond to any type of physical resource or radio resource expressed in terms of length of time or time interval or time duration. Examples of time resources are: symbol, mini-slot, time slot, subframe, radio frame, Transmission Time Interval (TTI), interleaving time, etc.

TTI: The term TTI used herein may correspond to any time period over which a physical channel can be encoded and interleaved for transmission. The physical channel is decoded by the receiver over the same time period (T0) over which it was encoded. The TTI may also interchangeably called short TTI (sTTI), transmission time, slot, sub-slot, mini-slot, Short Subframe (SSF), mini-subframe etc.

Sounding Reference Signal (SRS) Switching: The term SRS switching (e.g., SRS carrier-based switching, SRS carrier switching, etc.) herein may comprise a UE operation when the UE is switching to a Physical Uplink Shared Channel (PUSCH)-less carrier (a carrier without Physical Uplink Control Channel (PUCCH)/PUSCH configured) in order to perform an uplink (UL) transmission (e.g., SRS or Physical Random Access Channel (PRACH)) and then switches to another PUSCH-less carrier or back to a serving carrier.

In Carrier Aggregation (CA) the UE is configured with two or more carriers and the UE can have multiple serving cells on their respective Component Carriers (CC). Examples of serving cells are Primary Cell (PCell), Secondary Cell (SCell), etc. Other types of serving cells can be with Dual Connectivity (DC)—see below.

DC: The term DC used herein may refer to the operation mode wherein the UE can be served by at least two nodes called a Master Node (MN) (e.g., Master eNB (MeNB), Master gNB (MgNB), etc.) or a Secondary Node (SN) (e.g., Secondary eNB (SeNB), Secondary gNB (SgNB), etc.). More generally, in multiple connectivity (or multi-connectivity) operation the UE can be served by two or more nodes, such as an MeNB, a first SeNB (SeNB1), a second SeNB (SeNB2), and so on. The UE is configured with a Primary Component Carrier (PCC) from both the MN and SN. As an example, the main serving cells from the MN and SN are called PCell and Primary Secondary Cell (PSCell) respectively. The PCell and PSCell typically operate the UE independently. The UE is also configured with one or more Secondary Component Carriers (SCCs) from each node involved in multi-connectivity (e.g., one or more SCells from the MN and SN). The corresponding secondary serving cells served by the MN and SN are called SCell. The UE in DC typically has separate Transmission (TX)/Reception (RX) for each of the connections with the MN and SN. This allows the MN and SN to independently configure the UE with one or more procedures (e.g., Radio Link Monitoring (RLM), Discontinuous Reception (DRX) cycle, etc.) on their respective PCell and PSCell. The above definitions also include DC operation, which is performed based on corresponding CA configurations.

In NR, there are different variants of multi-connectivity (e.g., Evolved Universal Terrestrial Radio Access (E-UTRA) NR DC (EN-DC), NR E-UTRA DC (NE-DC), NR-NR DC (NN-DC), etc.). In EN-DC, the MN contains LTE serving cells with at least LTE PCell and the SN contains NR serving cells with at least NR PSCell. In NE-DC, the MN contains NR serving cells with at least NR PCell and the SN contains LTE serving cells with at least LTE PSCell. In NR-NR DC, the MN contains NR serving cells with at least NR PCell and the SN also contains NR serving cells with at least NR PSCell. The embodiments are applicable for any type or variant of multi-connectivity operation in NR, LTE or any other Radio Access Technology (RAT) or combination of different RATs. In this disclosure, all methods that are described for CA operation are equally applicable to DC operation and vice versa, unless stated otherwise.

Alignment: The term time alignment or misalignment between cells used herein may refer to a Maximum Receive Timing Difference (MRTD) of the signals from serving cells (e.g., PCell and SCell) received at the UE and/or a Maximum Uplink Transmission Timing Difference (MTTD) between serving cells of different Timing Advance Groups (TAGs). An example of MRTD is ±30.26 microseconds (μs) in CA and ±33 μs in DC if Subcarrier Spacing (SCS)=15 kilohertz (kHz) on both serving cells involved in MRTD. An example of MTTD is ±35.21 μs in CA if SCS=15 kHz on both serving cells involved in MTTD. MTTD can be between PCell and PSCell belonging to primary TAG (pTAG) in MN and primary secondary TAG (psTAG) in SN respectively in DC or between a PCell and SCell belonging to pTAG and secondary TAG (sTAG) respectively in CA. MRTD and MTTD may further depend on the SCS of the serving cells and whether they belong to the same band or different bands. In DC (multi-RAT or single RAT), the handling of MRTD and MTTD at the UE depends on one or more of: the UE architecture, numerologies (e.g., SCS) of signals from the MN (e.g., PCell) and the SN (e.g., PSCell) etc. This gives rise to two cases of DC operation with respect to the UE synchronization status or level, namely: synchronized DC operation and unsynchronized DC operation. The synchronized DC operation and unsynchronized DC operation are also interchangeably called synchronous and asynchronous DC. For example, in synchronous and asynchronous DC the UE can handle MRTD up to a magnitude of 33 μs and 500 μs respectively.

Impact of SRS Switching: Herein, the term "impact of SRS switching" may comprise one or more interruption related parameters or metrics. The term interruption or interruption level or interruption performance used herein may correspond to any type of interruption of transmitted and/or received signals between the UE and the serving cell (e.g., PCell, SCells, PSCell, etc.). The interruption leads to loss or degradation of serving cell performance. The loss in serving cell performance or the interruption can be expressed in terms of one or more metrics, which may be absolute or relative, such as error rate or loss of packets or packet loss rate or number of packets lost or packet drop rate or a reduction in the detection probability or an increase of misdetection probability or even probability of missed or dropped or lost packets. Lost packets may even be determined indirectly—for example, the number of total packets may be predefined or known but there is a minimum number of packets to be received and/or transmitted (not larger than the total) which together (e.g., their difference) implicitly determine the number of lost packets.

The interruption level can be expressed in terms of one or more time resources which are interrupted, such as an interruption time of 1 subframe, 2 subframes, 1 slot, 2 slots, 1 symbol, 2 symbols, etc. The packet herein refers to any 'block of data' such as transport block sent over a radio interface in UL or downlink (DL). The packet loss rate or number of lost packets is typically estimated over a certain period of time, such as a measurement time of a radio measurement, a predefined time, etc. In one example the number of lost packets is expressed as total number of missed Acknowledgements (ACKs)/Negative Acknowledgements (NACKs) in response to continuous transmission of data to the UE from its serving cell over a certain time period. In LTE the transmission opportunity or scheduling instance is 1 millisecond (ms) (e.g., 1 TTI is 1 subframe). Therefore, for example, the number of packets lost in LTE is 10 if the UE is unable to transmit 10 ACKs/NACKs in UL in response to continuous DL transmission over a period of 100 ms. In this example the corresponding packet loss rate is 10% or 0.1. This may also be stated as the probability with which the fraction of ACKs/NACKs transmitted in the UL in response to continuous DL transmission over a period are missed or dropped or lost. It may also be expressed as ratio of: 1) the number of missed ACKs/NACKs in response to continuous transmission of data to the UE from its serving cell over certain time period (T0) to 2) the total number of ACKs/NACKs in response to continuous transmission of data to the UE from its serving cell if all data blocks are received.

Therefore, the serving cell performance (e.g., PCell or SCell or PSCell performance) may also be expressed in terms of the probability of missed ACKs/NACKs. More specifically, it can be expressed as the serving cell interruptions in terms of the probability of missed ACKs/NACKs, the number of missed ACKs/NACKs to be transmitted or received, or the interruption time.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s) related to SRS switching. For example, no methods exist to determine the interruption due to SRS switching in case of different numerologies. In addition, no methods exist to determine the interruption due to SRS switching in different mixed LTE-NR deployments (e.g., in EN-DC, NE-DC, etc.).

Certain aspects of the present disclosure and their embodiments may provide solutions to the aforementioned or other challenges. The present disclosure includes methods, devices, and systems for controlling SRS switching impact, such as in a UE and in a network node.

According to one embodiment, a UE is configured to perform SRS carrier-based switching across serving cells of the same Cell Group (CG) (e.g., TAG, Master Cell Group (MCG), Secondary Cell Group (SCG), etc.) for at least two different CGs. The SRS switching in CG1 causes interruption to serving cells in CG1 and also causes interruption to serving cells in the other CG (CG2). The amount of interruption (e.g., interruption duration, interruption probability, lost packets, etc.) on each serving cell depends on whether the SRS carrier-based switching actions in the at least two CGs fully overlap in time or partially overlap in time with respect to each other. In the latter case, the amount of interruption further depends on the amount of overlap in time between the SRS carrier-based switching actions. The amount of interruption further depends on the numerology (e.g., SCS) used in serving cells in CG1 and the numerology used (e.g., SCS) in serving cells in CG2. The amount of interruption further depends on the relation between the frequency ranges (e.g., FR1 or FR2) of the serving cells in CG1 and the frequency ranges (e.g., FR1 or FR2) of the serving cells in CG2.

Examples of SRS carrier-based switching in serving cells across the same CG for two different CGs are:
- SRS switching between LTE serving cells in CG1 and SRS switching between NR serving cells in CG2 in multi-RAT EN-DC. Examples of multi-RAT EN-DC are EN-DC, NE-DC, etc. Examples of CG1 and CG2 are MCG and SCG respectively.
- SRS switching between serving cells in CG1 and SRS switching between serving cells in CG2 in single-RAT DC (e.g., NR-NR DC, etc.). CG1 and CG2 are associated with a pTAG and a psTAG respectively.
- SRS switching between serving cells in CG1 and SRS switching between serving cells in CG2 in CA (e.g., CA with at least two UL carriers, etc.). CG1 and CG2 are associated with a pTAG and a sTAG respectively.

In another embodiment, the impact of an SRS switching configuration on the UE performance is determined based on predefined rules, depending on frequency distance or frequency separation, numerology, time alignment/misalignment between cells (e.g., MRTD and/or MTTD, RAT, etc.), and more generally, the amount W of impact of SRS switching can be a function W=f[(abs(F_from-F1)], [SCS1], [SCS_srs], [$\Delta$t_1,from], [$\Delta$t_1,to], [$\Delta$t_from,to], [RAT1, RAT_srs], [RAT1_srs, RAT2_srs]).

The first embodiments for two or more SRS switching configurations or loops configured in the UE in parallel (e.g., Scenario 4, described further below) may also use second embodiments (e.g., for Scenarios 1-3 and 5, described further below) for details of determining the individual impact of each one of the SRS switching loops (e.g., in each RAT) on the UE, before determining the combined impact on the UE which is a function of the individual impacts.

There are, proposed herein, various embodiments which address one or more of the issues disclosed herein. An example embodiment relates to a method performed by a wireless device for controlling SRS switching impact. The method includes sensing a radio condition indicating SRS switching from a first carrier to a second carrier in a first time resource. The method also includes determining an amount of impact of the SRS switching for the first time resource. At least one of the first carrier and the second carrier has a flexible SCS. In some examples, the method also includes performing one or more operational tasks based on the determined amount of impact.

Another example embodiment relates to a method performed by a base station for controlling SRS switching impact. The method includes receiving a radio condition (e.g., from a wireless device) indicating SRS switching from a first carrier to a second carrier in a first time resource. The method also includes determining an amount of impact of the SRS switching for the first time resource. At least one of the first carrier and the second carrier has a flexible SCS. In some examples, the method also includes performing one or more operational tasks based on the determined amount of impact.

Certain embodiments may provide one or more of the following technical advantage(s). For example, embodiments may determine the amount of interruption due to SRS switching in case of different numerologies and RATs. In addition, embodiments may determine the combined amount of interruption when two or more SRS switching configurations are configured for the UE. Based on the determined amount of SRS switching impact, the UE may compensate for the SRS switching impact in NR and mixed LTE-NR deployment. Based on the determined amount of SRS switching impact, the network node and UE may avoid the SRS switching impact in NR and mixed LTE-NR deployments.

Figure 2:
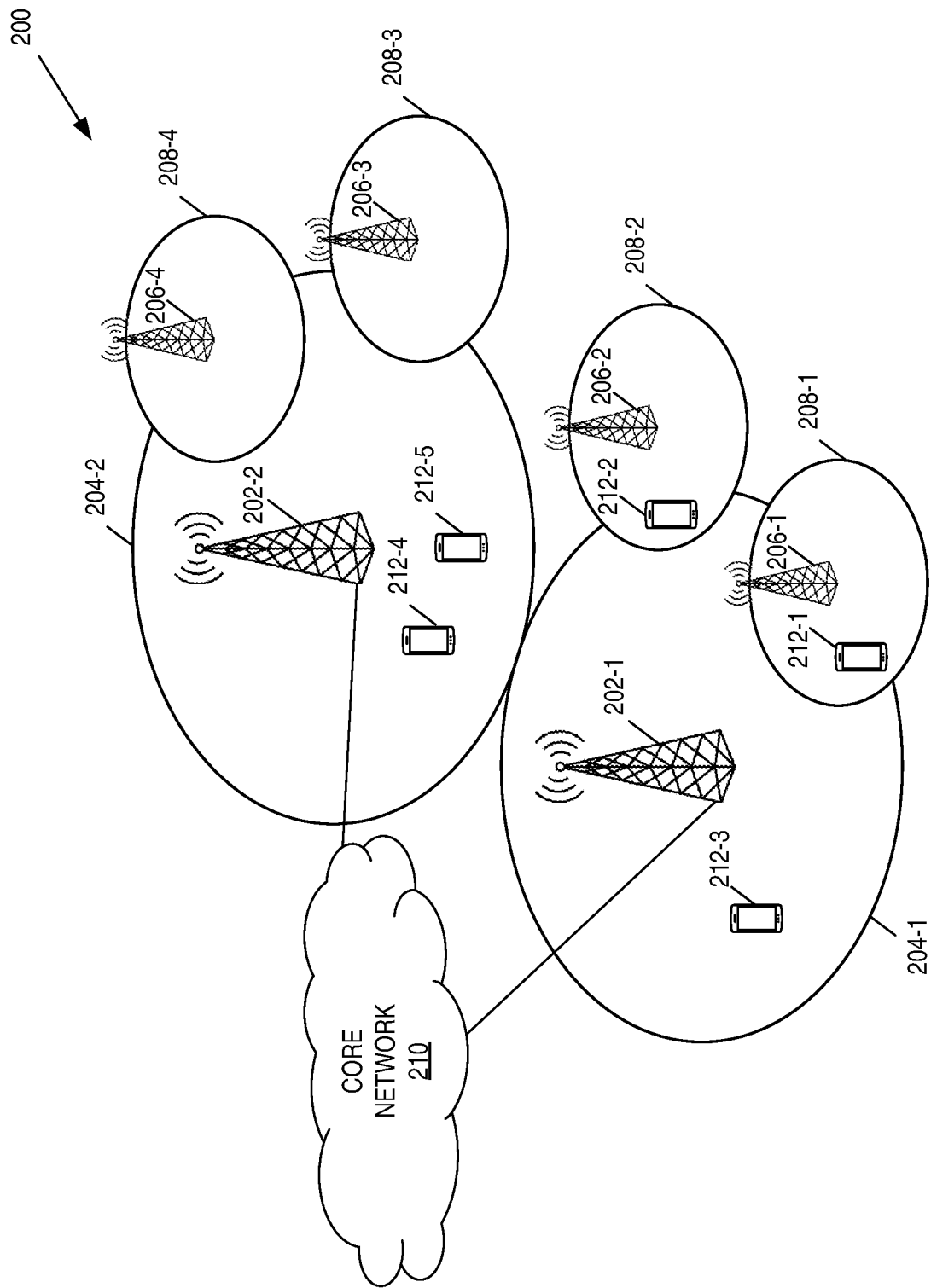
FIG. 2 illustrates one example of a cellular communications network in which embodiments of the present disclosure may be implemented.

FIG. 2 illustrates one example of a cellular communications network 200 according to some embodiments of the present disclosure. In this example, the cellular communications network 200 includes base stations 202-1 and 202-2, which in LTE are referred to as eNBs and in 5G NR are referred to as gNBs, controlling corresponding macro cells 204-1 and 204-2. The base stations 202-1 and 202-2 are generally referred to herein collectively as base stations 202 and individually as base station 202. Likewise, the macro cells 204-1 and 204-2 are generally referred to herein collectively as macro cells 204 and individually as macro cell 204. The cellular communications network 200 may also include a number of low power nodes 206-1 through 206-4 controlling corresponding small cells 208-1 through 208-4. The low power nodes 206-1 through 206-4 can be small base stations (such as pico or femto base stations) or RRHs, or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The base stations 202 (and optionally the low power nodes 206) are connected to a core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

EXAMPLE SCENARIOS

Figure 3:
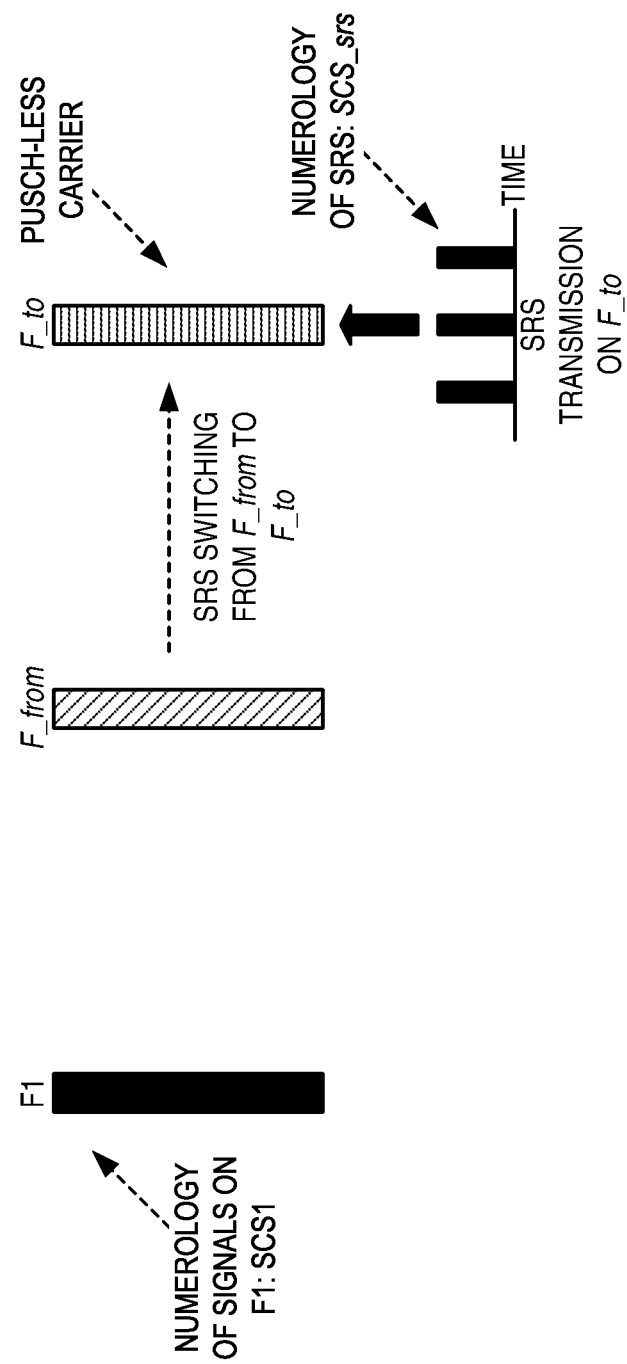
FIG. 3 illustrates a first scenario of SRS switching, where a User Equipment (UE) transmits SRS (e.g., periodic) on a target uplink carrier F_to after switching from using an origin uplink carrier F_from.

FIG. 3 illustrates a first scenario of SRS switching, where a UE transmits SRS (e.g., periodic) on a target UL carrier F_to after switching from using an origin UL carrier F_from. This scenario can comprise SRS switching within NR since numerologies can be different on different carriers. In the first scenario, the UE is expected to use numerology SCS1 for one or more operational tasks in carrier frequency F1 (which may or may not be a serving carrier frequency) any time before, during, or after the SRS switching from the origin UL carrier F_from and/or to the target UL carrier F_to in order to transmit SRS on the target UL carrier F_to using numerology SCS_srs.

In some examples of the first scenario, the carrier frequency F1 and the origin UL carrier F_from may or may not be the same (e.g., the carrier frequency F1 may be a serving carrier from which the UE is switching or it can be a monitored or measured non-serving carrier which is still impacted by SRS switching). In some examples, the carrier frequency F1 and the target UL carrier F_to may or may not be the same (e.g., F1 may be a serving carrier to which the UE is switching or it can be a monitored or measured non-serving carrier which is still impacted by SRS switching). In other examples, all of F1, F_from, and F_to may be different.

Figure 4:
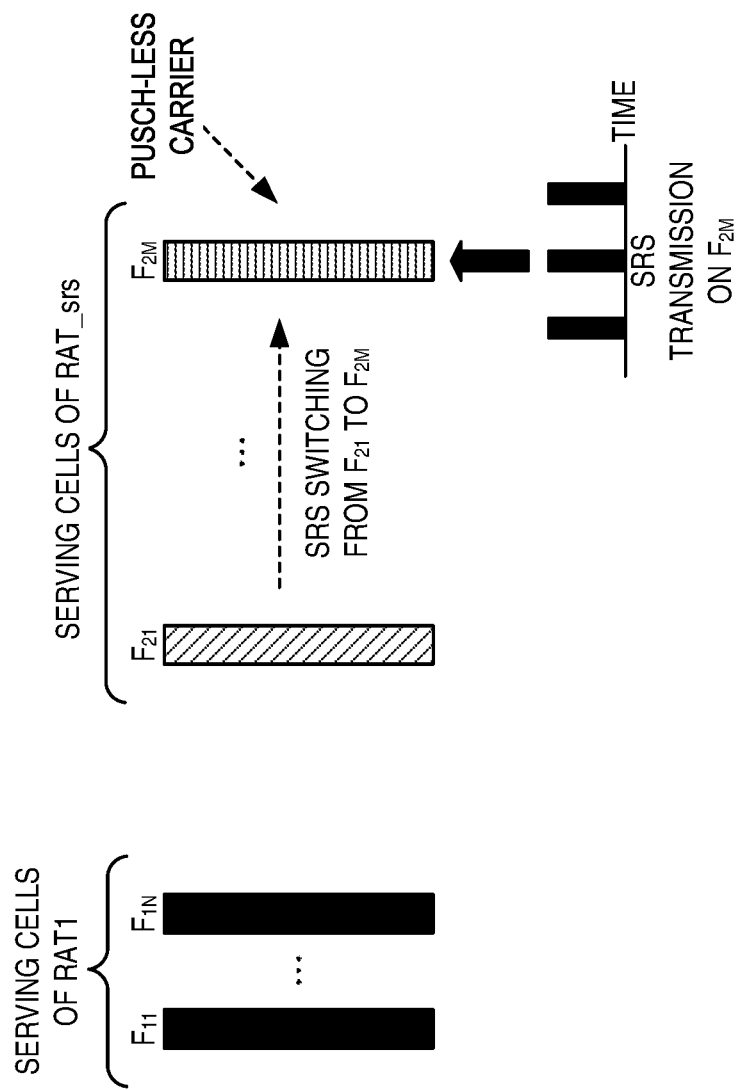
FIG. 4 illustrates a second scenario of SRS switching, where a UE performs SRS switching between serving cells of a second radio access technology.

FIG. 4 illustrates a second scenario of SRS switching, where a UE performs SRS switching between serving cells of a second RAT (e.g., RAT_srs). The UE can be configured with up to N number of serving cells on their respective N carriers ($F_{11}, \ldots F_{1N}$) in a first RAT (RAT1), and with up to M number of serving cells on their respective M carriers ($F_{21}, \ldots F_{2M}$) in RAT_srs, where N≥1 and M≥2. In some cases, N=1 and M=2.

In the second scenario, the UE is served by at least one RAT1 (e.g., RAT1 has one or more serving cells of the UE, such as one or more of: a PCell, a PSCell, and/or an SCell) and performs SRS switching within RAT_srs, which is different from RAT1. The carriers for RAT1 and RAT_srs may be in the same or different frequency bands. The carriers for RAT1 and RAT_srs may further be in the same or different frequency ranges.

Figure 5:
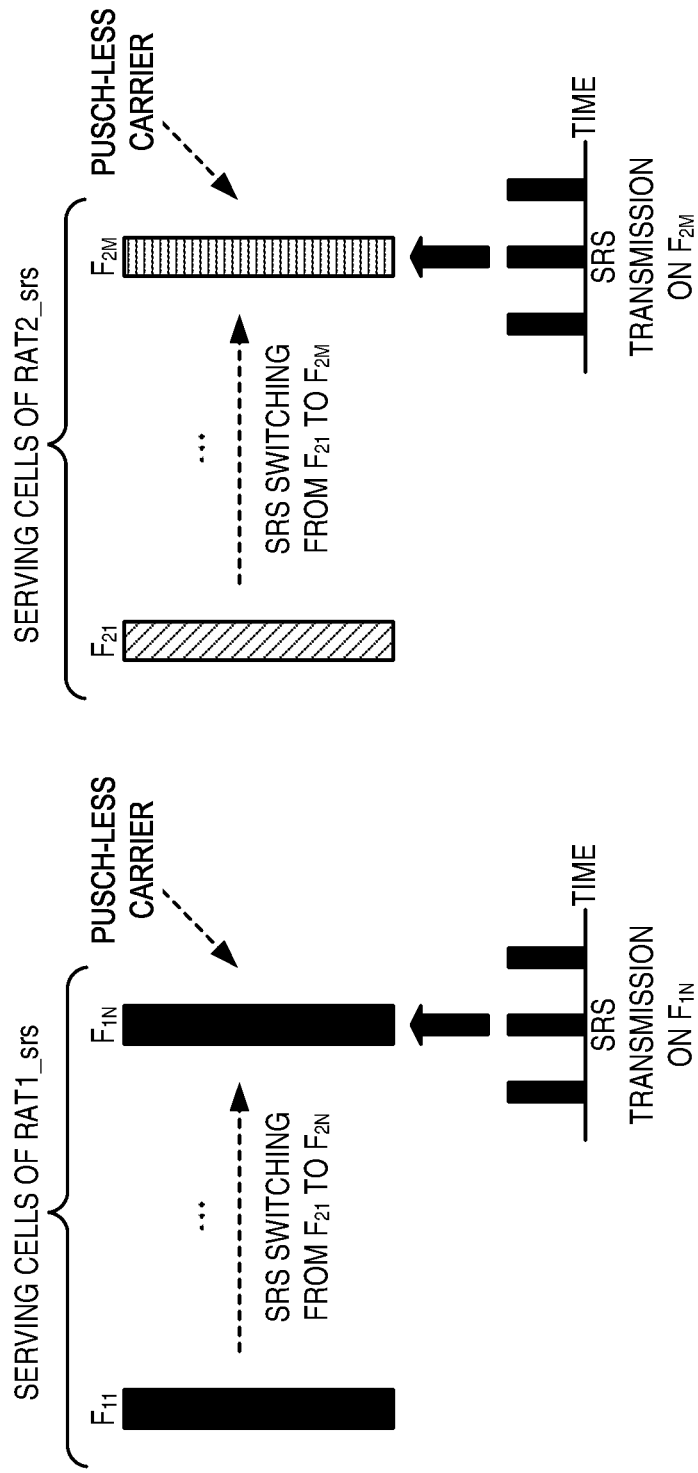
FIG. 5 illustrates a third scenario of SRS switching, where the UE performs SRS switching between serving cells of a first radio access technology RAT1 and also between serving cells of a second radio access technology RAT2.

FIG. 5 illustrates a third scenario of SRS switching, where the UE performs SRS switching between serving cells of a first RAT (RAT1) and also between serving cells of a second RAT (RAT2). The UE can be configured with up to N number of serving cells on their respective N carriers ($F_{11}, \ldots F_{1N}$) in RAT1, and with up to M number of serving cells on their respective M carriers ($F_{21}, \ldots F_{2M}$) in RAT2, where N≥2 and M≥2. In some cases, N=2 and M=2.

In the third scenario, the UE performs SRS switching between serving cells of the same RAT in at least two RATs, RAT1_srs and RAT2_srs. The serving cells of RAT1_srs and serving cells of RAT2_srs belong to their respective Timing Advance (TA) groups, such as pTAG and psTAG respectively (e.g., in multi-RAT-DC, such as EN-DC or NE-DC). The carriers for RAT1_srs and RAT2_srs may be in the same or different frequency bands. The carriers for RAT1_srs and RAT2_srs may further be in the same or different frequency ranges.

As an example, the third scenario may comprise a UE configured with EN-DC and the SRS switching occurs across LTE serving cells within MCG. In this example, the SRS switching occurs across NR serving cells within SCG. In another example the third scenario may comprise a UE configured with NE-DC and the SRS switching occurs across NR serving cells within MCG. In this example, the SRS switching occurs across LTE serving cells within SCG. The two SRS procedures in RAT1 and RAT2 are independently performed between their respective groups of serving cells.

In a fourth scenario of SRS switching, a UE performs SRS switching between serving cells in the same CG for at least two cell groups. Each CG is associated with separate TAGs (e.g., CG1 and CG2 with TAG1 and TAG2 respectively). Examples of CG1 and CG2 are MCG and SCG, respectively. Examples of TAG1 and TAG2 are pTAG and psTAG, respectively, in DC. Serving cells in both CGs operate using the same RAT (e.g., NR-NR DC, LTE-LTE DC). Serving cells in different TAGs may typically belong to different bands or the same band.

In a fifth scenario of SRS switching, a UE performs SRS switching between serving cells comprised in at least two different RATs, RAT1_srs and RAT2_srs (e.g., in multi-RAT-DC or multi-RAT CA). The carriers for RAT1_srs and RAT2_srs may be in the same or different frequency bands (e.g., RAT1_srs is LTE and RAT2_srs is NR in the LTE frequency band, wherein some LTE cells and NR cells may even have overlapping bandwidths). The carriers for RAT1_srs and RAT2_srs may further be in the same or different frequency ranges.

Embodiments with two or more SRS switching loops (e.g., the fourth scenario) may also use other embodiments (e.g., for the first, second, third, and/or fifth scenario) for details of determining the individual impact of each one of the SRS switching loops (e.g., in each RAT) on the UE, before determining the combined impact on the UE which is a function of the individual impacts.

Methods for Determining the Impact of SRS Switching

According to one embodiment, the amount W of impact of SRS switching (e.g., interruption time and/or interruption probability and/or the number of lost packets) is determined by one or more of the below:

Frequency distance or frequency separation: For example, the frequency distance between F1 and F_from (see, e.g., FIG. 3 and scenario 1). For example, the amount of impact is a first amount W1 of impact when F1 and F_from belong to different frequency ranges or the frequency distance is above a threshold, and a second amount W2 of impact otherwise, wherein W1<W2.

Numerology: For example, a first subcarrier spacing SCS1 (see, e.g., FIG. 3 and scenario 1). For example, the amount of impact is W1 when SCS1<threshold, otherwise W2, wherein W2<W1. As another example, an SRS subcarrier spacing SCS_srs (see, e.g., FIG. 3 and scenario 1). For example, the amount of impact is W1 when SCS_srs<threshold, otherwise W2, wherein W2<W1.

Time alignment/misalignment between cells: For example, MRTD and/or MTTD. In some examples, $\Delta t\_1,\text{from}$, which is the time misalignment between F1 and F_from (see, e.g., FIG. 3 and scenario 1), is used. For example, the amount of impact is W1 when the time misalignment>threshold, otherwise W2, wherein W1>W2. In some examples, $\Delta t\_1,\text{to}$, which is the time misalignment between F1 and F_to (see, e.g., FIG. 3 and scenario 1), is used. For example, the amount of impact is W1 when the time misalignment>threshold, otherwise W2, wherein W1>W2. In some examples, $\Delta t\_\text{from,to}$, which is the time misalignment between F_from and F_to, is used. For example, the amount of impact is W1 when the time misalignment>threshold, otherwise W2, wherein W1>W2.

RAT: The RAT of the impacted carrier and RAT to which and/or from which SRS switching occurs.

More generally, the amount W of impact of SRS switching can be a function of at least one of the listed parameters (see also the Example Scenarios above for some parameter definitions):

$W=f[(abs(F\_from-F1))], [SCS1], [SCS\_srs], [\Delta t\_1,from], [\Delta t\_1,to], [\Delta t\_from,to], [RAT1,RAT\_srs], [RAT1\_srs, RAT2\_srs]).$ The amount of impact of SRS switching may be determined by the UE and/or by a network node (e.g., base station).

The UE may use the determined amount of SRS switching impact in the UE for one or more operational tasks, such as determining the applicable UE Radio Resource Management (RRM) requirement the UE needs to meet (e.g., interruption requirement), determining UE performance (e.g., serving cell performance) when the UE is performing SRS switching, compensating for the determined impact (see also the Methods for Compensating for or Avoiding SRS Switching Impact on UE Operational Task, below), adapting UE operation to reduce the impact of SRS switching on UE performance, avoiding the determined potential impact or scheduling its operational tasks to reduce the overlap with the time of interruption (see also the Methods for Compensating for or Avoiding SRS Switching Impact on UE Operational Task, below), etc.

The network node may use the determined amount of SRS switching impact in the UE for one or more network node's operational tasks, e.g., determining the applicable UE RRM requirement the UE needs to meet (e.g., interruption requirement), determining UE performance (e.g., serving cell performance) when the UE is performing SRS switching, compensating for the determined impact (see also the Methods for Compensating for or Avoiding SRS Switching Impact on UE Operational Task, below), adapting UE configuration or scheduling (e.g., of SRS switching, data transmissions to and/or from UE, UE measurements, etc.) to reduce the impact of SRS switching on UE performance, avoiding the determined potential impact or scheduling its operational tasks to reduce the overlap with the time of interruption (see also the Methods for Compensating for or Avoiding SRS Switching Impact on UE Operational Task, below), etc. The network node may also act differently towards the UE, depending on the determined amount of SRS switching impact. For example, the network node can take a first action when the impact W is below a threshold but it can take a second action otherwise. In another example, the network node may adapt UE configuration or the configuration of its signals (e.g., their periodicity) to be used by the UE so that the impact W is below a threshold when the UE is configured with SRS switching. In yet another example, the network node may choose an SRS switching configuration for which the impact is below a threshold. In yet another example, the network node may choose to configure two SRS switching loops with a larger overlap (e.g., in different RATs or in different TAGs) if this reduces the overall UE impact.

Specific Examples of Determining the Impact of SRS Switching

In a first example, the amount of impact W may be NR impact due to intra-NR SRS switching. For switching to a PUSCH-less carrier:

$2^\mu$ NR slots ($\mu$ is determined by the SCS of the impacted (victim) carrier, e.g., the SCS may be a function [e.g., min( . . . ), max( . . . )] of SCS before and/or during the switching on the impacted carrier, and is defined in the Background section above), which includes the time comprising the NR slot with the first NR SRS/PRACH transmission on the PUSCH-less carrier, when the misalignment is below a threshold or UE indicates interruption capability below a second threshold or SCS of the PUSCH-less carrier is above a third threshold.

$2^{\mu+1}$ NR slots, which include the time comprising the NR slot with the first NR SRS/PRACH transmission on the PUSCH-less carrier, when the misalignment is above a threshold or as a generic case for any misalignment.

For switching from a PUSCH-less carrier:

$2^\mu$ NR slots, which include the time comprising the NR slot with the last NR SRS/PRACH transmission on the PUSCH-less carrier, when the misalignment is below a threshold or UE indicates interruption capability below a second threshold or SCS of the PUSCH-less carrier is above a third threshold.

$2^{\mu+1}$ NR slots, which include the time comprising the NR slot with the last NR SRS/PRACH transmission on the PUSCH-less carrier, when the misalignment is above a threshold or as a generic case for any misalignment.

In a second example, the amount of impact W may be LTE impact due to intra-NR SRS switching. For switching to a PUSCH-less carrier:

1 subframe, which includes the time comprising the NR slot with the first NR SRS/PRACH transmission on the PUSCH-less carrier, when the misalignment is below a threshold or UE indicates interruption capability below a second threshold or SCS of the PUSCH-less carrier is above a third threshold.

2 subframes, which include the time comprising the NR slot with the first NR SRS/PRACH transmission on the PUSCH-less carrier, when the misalignment is above a threshold or as a generic case for any misalignment.

For switching from a PUSCH-less carrier:

1 subframe, which includes the time comprising the NR slot with the last NR SRS/PRACH transmission on the PUSCH-less carrier, when the misalignment is below a threshold or UE indicates interruption capability below a second threshold or SCS of the PUSCH-less carrier is above a third threshold.

2 subframes, which include the time comprising the NR slot with the last NR SRS/PRACH transmission on the PUSCH-less carrier, when the misalignment is above a threshold or as a generic case for any misalignment.

In a third example, the amount of impact W may be NR impact due to intra-LTE SRS switching. For switching to a PUSCH-less carrier:

- $2^\mu$ NR slots, which include the time comprising the LTE subframe with the first LTE SRS/PRACH transmission on the PUSCH-less carrier, when the misalignment is below a threshold or UE indicates interruption capability below a second threshold.
- $2^{\mu+1}$ NR slots, which include the time comprising the LTE subframe with the first LTE SRS/PRACH transmission on the PUSCH-less carrier, when the misalignment is above a threshold or as a generic case for any misalignment.

For switching from a PUSCH-less carrier:

- $2^\mu$ NR slots, which include the time comprising the LTE subframe with the last LTE SRS/PRACH transmission on the PUSCH-less carrier, when the misalignment is below a threshold or UE indicates interruption capability below a second threshold.
- $2^{\mu+1}$ NR slots, which include the time comprising the LTE subframe with the last LTE SRS/PRACH transmission on the PUSCH-less carrier, when the misalignment is above a threshold or as a generic case for any misalignment.

In a fourth example, the amount of impact W may be NR and LTE impact due to simultaneous intra-LTE SRS switching and intra-NR SRS switching. In one example where the SRS switching is configured across LTE serving cells, and also SRS switching is configured across NR serving cells (e.g., in multi-RAT DC such as EN-DC, NE-DC, etc.), the SRS switching in the two RATs may at least partially overlap in time. For example, the SRS may switch from NR serving cell on $F_{11}$ to another NR serving cell with PUSCH-less carrier $F_{12}$ during time period, T1. Also for example the SRS may switch from LTE serving cell on $F_{21}$ to another NR serving cell with PUSCH-less carrier $F_{22}$ during time period, T2, where T1 and T2 at least partially overlap. In this case the impact on NR serving cell comprises impact due to intra-LTE SRS switching and intra-NR SRS switching. Also in this case the impact on LTE serving cell comprises impact due to intra-LTE SRS switching and intra-NR SRS switching.

However, in these two cases the amount of interruption impact may be the same or they can be different. For example, this depends on the frequency relation between LTE and NR serving cells, numerology, etc. The amount of interruption further depends on whether the SRS switching in NR and LTE fully overlap in time or partially overlap in time.

In general the total interruption on a RATi is expressed as:

$$W = T_{total\_RATi} = F(T_{intra\_RATi}, T_{inter\_RATj}, T_{align}, \alpha, \gamma)$$

where $i \in \{1, 2, \ldots\}$ and $j \in \{1, 2, \ldots\}$. $T_{total\_RATi}$=Total interruption length in time, e.g. X number of slots or Y subframes. $T_{intra\_RATi}$=interruption on RATi serving cells caused by SRS switching across RATi serving cells. $T_{inter\_RATj}$=interruption on RATi serving cells caused by SRS switching across RATj serving cells. $\alpha$=margin, e.g., to account for simultaneous switching in RAT1 and RAT2. As a special case, $\alpha$ can be negligible. $T_{align}$=Time misalignment between RAT1 and RAT2 (e.g., MRTD, MTTD, etc.). RAT1 and RAT2 can be NR and LTE respectively or vice versa. $\gamma$ is the parameter related to the amount of overlap of SRS switching in two RATs in time ($\gamma$=0 if the overlap is small or below a threshold or in case of fully overlapping SRS switching).

Case of fully overlapping SRS switching across serving cells in both RATs: In one specific example, if SRS switching in the two RATs fully overlap with each other in time (e.g., from multiple switching occasions perspective: have the same periodicity, same duration, and same offset with respect to a reference time; or from single switching occasion perspective: occur in the same slot or same subframe in time) then $T_{total\_RATi}$ on serving cell of RATi can be expressed as follows:

$$T_{total\_RATi\_full} = \text{MAX}(T_{intra\_RATi}, T_{inter\_RATj}) + T_{align} + \alpha$$

As another example, if RATi is LTE and RATj is NR, and if the SRS switching in the two RATs fully overlap with each other in time, then the total interruption on LTE serving cell can be expressed as follows:

$$T_{total\_LTE\_full} = \text{MAX}(T_{intra\_LTE}, T_{inter\_NR}) + T_{align} + \alpha$$

In the above example of expression ($T_{total\_LTE\_full}$), $T_{inter\_NR}$=0 if the NR serving cells involved in SRS switching belong to carriers in frequency range #2 (FR2) and the UE is capable of per frequency range measurement gap. The LTE serving cells operate on carriers in frequency range #1 (FR1). As an example frequencies comprised in FR1 are lower than frequencies comprised in FR2.

As another example, if RATi is NR and RATj is LTE, and if the SRS switching in the two RATs fully overlap with each other in time, then the total interruption on NR serving cell can be expressed as follows:

$$T_{total\_NR\_full} = \text{MAX}(T_{intra\_NR}, T_{inter\_LTE}) + T_{align} + \alpha$$

In the above example of expression ($T_{total\_NR\_full}$), $T_{intra\_LTE}$=0 if the NR serving cells involved in SRS switching belong to carriers in frequency range #2 (FR2) and the UE is capable of per frequency range measurement gap.

Case of partially overlapping SRS switching across serving cells between the RATs: As an example, if SRS switching in the two RATs partially overlap with each other in time then $T_{total,i}$ on serving cell of RATi can be expressed as follows:

$$T_{total\_RATi\_partial} = T_{intra\_RATi} + T_{inter\_RATj} + T_{align} + \alpha - \gamma,$$

wherein $\gamma$ is the parameter related to the amount of overlap of SRS switching in two RATs in time ($\gamma$=0 if the overlap is small or below a threshold).

As another example, if RATi is LTE and RATj is NR, and if the SRS switching in the two RATs partially overlap with each other in time, then the total interruption on LTE serving cell can be expressed as follows:

$$T_{total\_LTE\_partial} = T_{intra\_LTE} + T_{inter\_NR} + T_{align} + \alpha - \gamma,$$

wherein $\gamma$ is the parameter related to the amount of overlap. In the above example of expression ($T_{total\_LTE\_partial}$), $T_{inter\_NR}$=0 if the NR serving cells involved in SRS switching belong to carriers in frequency range #2 (FR2) and the UE is capable of per frequency range measurement gap.

As another example, if RATi is NR and RATj is LTE, and if the SRS switching in the two RATs fully overlap with each other in time, then the total interruption on NR serving cell can be expressed as follows:

$$T_{total\_NR\_partial} = T_{intra\_NR} + T_{inter\_LTE} + T_{align} + \alpha - \gamma,$$

wherein $\gamma$ is the parameter related to the amount of overlap. In the above example of expression ($T_{total\_NR\_partial}$), $T_{intra\_LTE}$=0 if the NR serving cells involved in SRS switching belong to carriers in frequency range #2 (FR2) and the UE is capable of per frequency range measurement gap.

As a special case in the above expressions, α=0. As another special case in the above expressions, $T_{align}$=1 ms for asynchronous DC case for SCS=15 kHz and 0 for synchronous DC case.

In a fifth example, the amount of impact W may be impact due to simultaneous SRS switching in different cell groups of the same RAT. The above expressions can also be applied for the case when the UE performs SRS switching between serving cells in the same CG for at least two CGs belonging to the same RAT: MCG and SCG configured with pTAG and psTAG respectively in NR-NR DC, MCG and SCG configured with pTAG and psTAG in LTE-LTE DC, etc.

In general the total interruption on serving cells of cell group i (CGi) can be expressed as:

$$W = T_{total\_CGi\_full} = F(T_{intra\_CGi}, T_{inter\_CGj}, T_{align}, \beta, \gamma),$$

wherein γ is the parameter related to the amount of overlap of SRS switching in two CGs in time (γ=0 if the overlap is small or below a threshold or in case of full overlap of SRS switching), $T_{intra\_CGi}$=interruption on CGi serving cells caused by SRS switching across CGi serving cells. $T_{inter\_CGj}$=interruption on CGi serving cells caused by SRS switching across CGj serving cells. β=margin to account for simultaneous switching in CG1 and CG2. As a special case, can be negligible. $T_{align}$=Time misalignment between CG1 and CG2 (e.g., MRTD, MTTD, etc.). CGi can be MCG and CGj can be SCG or vice versa.

Case of fully overlapping SRS switching across serving cells in both CGs: In one specific example, if SRS switching in the two CGs fully overlap with each other in time then $T_{total\_CGi}$ on serving cell of CGi can be expressed as follows:

$$T_{total\_CGi\_full} = MAX(T_{intra\_CGi}, T_{inter\_CGj}) + T_{align} + \beta$$

In the above example of expression ($T_{total\_CGi\_full}$), $T_{inter\_CGj}$=0 if the NR serving cells involved in SRS switching in CGi and NR serving cells involved in SRS switching in CGj belong to different frequency ranges (e.g., FR1 in CGi and FR2 in CGj or vice versa), and the UE is capable of per frequency range measurement gap.

Case of partially overlapping SRS switching across serving cells in different CGs: As an example, if SRS switching in the two CGs partially overlap with each other in time then $T_{total,CGi}$ on serving cell of CGi can be expressed as follows:

$$T_{total\_CGi\_partial} = T_{intra\_CGi} + T_{inter\_CGj} + T_{align} + \beta - \gamma,$$

wherein γ is the parameter related to the amount of overlap (γ=0 if the overlap is small or below a threshold). In the above example of expression ($T_{total\_CGi\_partial}$), $T_{inter\_CGj}$=0 if the NR serving cells involved in SRS switching in CGi and NR serving cells involved in SRS switching in CGj belong to different frequency ranges (e.g., FR1 in CGi and FR2 in CGj or vice versa), and the UE is capable of per frequency range measurement gap.

As a special case in the above expressions, β=0. As another special case in the above expressions, $T_{align}$=1 ms for asynchronous DC case for SCS=15 kHz and 0 for synchronous DC case.

Methods for Compensating for or Avoiding SRS Switching Impact on UE Operational Task Based on the determined amount of impact of SRS switching, the UE may compensate for the impact of SRS switching. For example, the UE can delay or extend the time for one or more of its operational tasks or procedures. Such tasks may include reception or transmissions of channels/signals (e.g., Demodulation Reference Signal (DMRS)/SRS/ PRACH), serving and/or neighbor cell measurements, RLM, random access, beam management, beam candidate/failure detection, Bandwidth Part (BWP) switching, measurement reporting, etc. The UE and the network (via scheduling) may also increase the number of total packets to compensate for the lost packets. The amount of compensation Δ may be a function of the amount W of SRS impact and one or more parameters critical for the operational task, e.g., Synchronization Signal/Physical Broadcasting Channel Block Measurement Timing Configuration (SMTC) periodicity, numerology, or SCS, etc.:

$$\Delta = f(W, SMTC\ periodicity, SCS, RAT, \ldots).$$

The amount of compensation may also depend on other parameters, such as UE interruption capability (e.g., indicated interruption value as described above), frequency range, UE activity level (e.g., DRX configuration), etc.

The amount of compensation Δ can be at least as large as the amount of impact W (see Methods for Determining the Impact of SRS Switching, above), for example, because an interruption measurement occasion may lead to extending the measurement time by the time until the next measurement occasion which may not be available immediately after the interrupted measurement occasion.

The compensation may also be conditional to the overlap in time between the time of the impact of SRS switching and one or more transmission or reception opportunities critical for the operational tasks or procedures, such as interruption due to SRS switching occurs during a Synchronization Signal Block (SSB) occasion or SMTC window which is critical for RRM measurements or RLM or beam management. If there is no overlap, the UE may not need to extend the operational task time.

In another embodiment, no compensation for the impact of SRS switching is allowed and the UE avoids the overlap between the time of the impact of SRS switching and the opportunities when the other operational task or procedure is performed (e.g., measurement or reception or transmission opportunities). This can be done by delaying or postponing or starting the SRS switching and/or the corresponding operational task earlier. Alternatively, a network node may control the UE to avoid the overlap, e.g., by scheduling the signals critical for the UE operational task and/or UE transmissions for the SRS switching so that there is a sufficient time separation between the two.

Additional Aspects/Information

Figure 6:
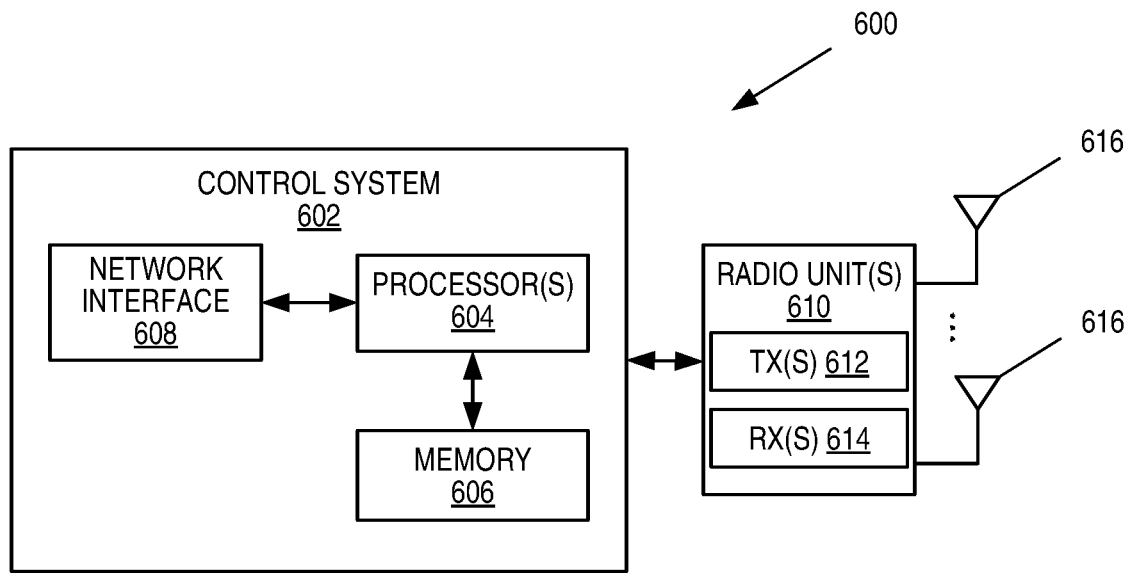
FIGS. 6 through 8 are schematic block diagrams of a radio access node according to some embodiments of the present disclosure.

FIG. 6 is a schematic block diagram of a radio access node 600 according to some embodiments of the present disclosure. The radio access node 600 may be, for example, a base station 202 or 206. As illustrated, the radio access node 600 includes a control system 602 that includes one or more processors 604 (e.g., Central Processing Units (CPUs), Application Specific Integrated Circuits (ASICs), Field Programmable Gate Arrays (FPGAs), and/or the like), memory 606, and a network interface 608. The one or more processors 604 are also referred to herein as processing circuitry. In addition, the radio access node 600 includes one or more radio units 610 that each includes one or more transmitters 612 and one or more receivers 614 coupled to one or more antennas 616. The radio units 610 may be referred to or be part of radio interface circuitry. In some embodiments, the radio unit(s) 610 is external to the control system 602 and connected to the control system 602 via, e.g., a wired connection (e.g., an optical cable). However, in some other embodiments, the radio unit(s) 610 and potentially the antenna(s) 616 are integrated together with the control system 602. The one or more processors 604 operate to provide one or more functions of a radio access node 600 as described herein. In some embodiments, the function(s) are implemented in software that is stored, e.g., in the memory 606 and executed by the one or more processors 604.

Figure 7:
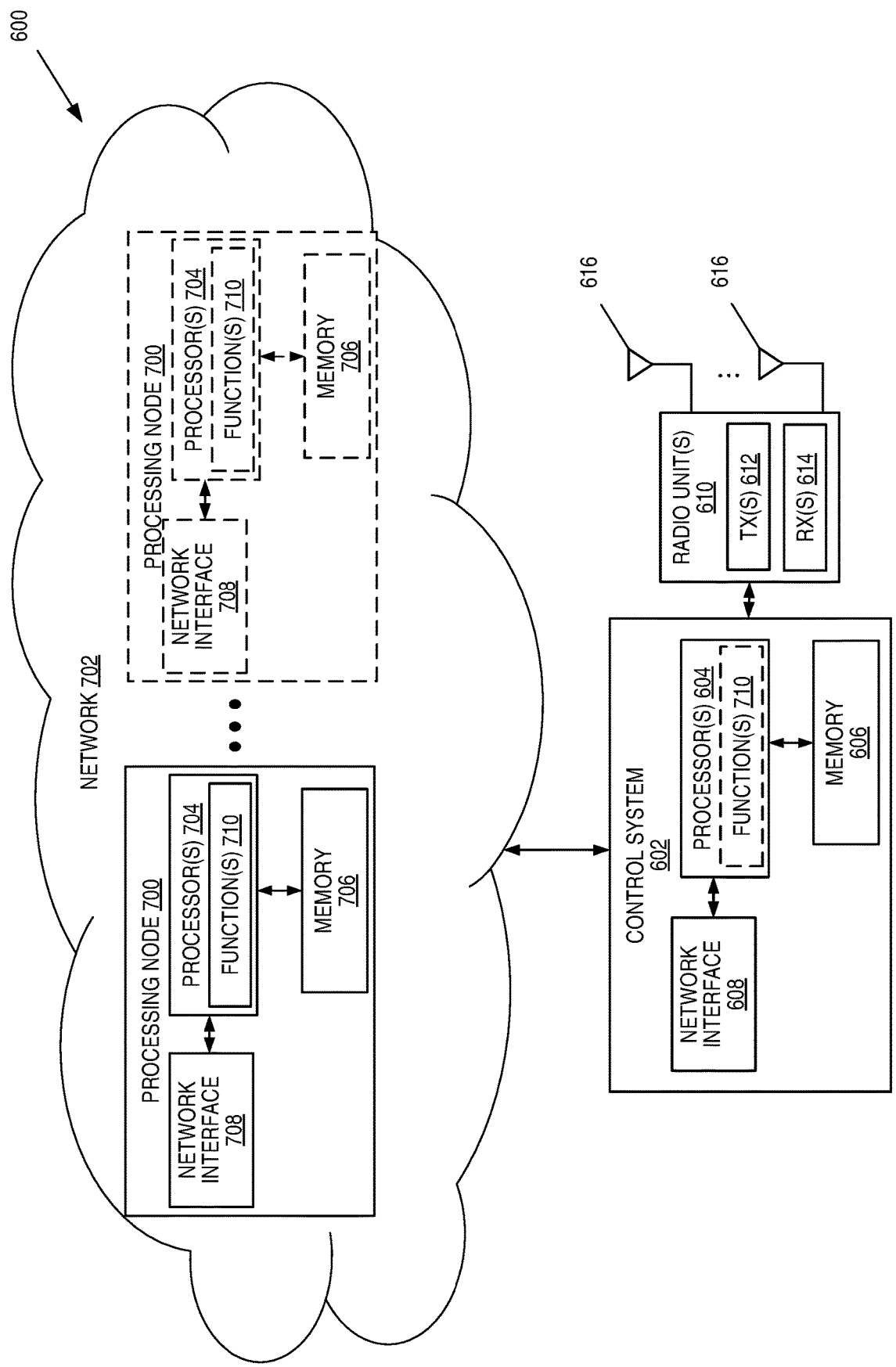

FIG. 7 is a schematic block diagram that illustrates a virtualized embodiment of the radio access node 600 according to some embodiments of the present disclosure. This discussion is equally applicable to other types of network nodes. Further, other types of network nodes may have similar virtualized architectures.

As used herein, a "virtualized" radio access node is an implementation of the radio access node 600 in which at least a portion of the functionality of the radio access node 600 is implemented as a virtual component(s) (e.g., via a virtual machine(s) executing on a physical processing node(s) in a network(s)). As illustrated, in this example, the radio access node 600 includes the control system 602 that includes the one or more processors 604 (e.g., CPUs, ASICs, FPGAs, and/or the like), the memory 606, and the network interface 608 and the one or more radio units 610 that each includes the one or more transmitters 612 and the one or more receivers 614 coupled to the one or more antennas 616, as described above. The control system 602 is connected to the radio unit(s) 610 via, for example, an optical cable or the like. The control system 602 is connected to one or more processing nodes 700 coupled to or included as part of a network(s) 702 via the network interface 608. Each processing node 700 includes one or more processors 704 (e.g., CPUs, ASICs, FPGAs, and/or the like), memory 706, and a network interface 708.

In this example, functions 710 of the radio access node 600 described herein are implemented at the one or more processing nodes 700 or distributed across the control system 602 and the one or more processing nodes 700 in any desired manner. In some particular embodiments, some or all of the functions 710 of the radio access node 600 described herein are implemented as virtual components executed by one or more virtual machines implemented in a virtual environment(s) hosted by the processing node(s) 700. As will be appreciated by one of ordinary skill in the art, additional signaling or communication between the processing node(s) 700 and the control system 602 is used in order to carry out at least some of the desired functions 710. Notably, in some embodiments, the control system 602 may not be included, in which case the radio unit(s) 610 communicate directly with the processing node(s) 700 via an appropriate network interface(s).

In some embodiments, a computer program including instructions which, when executed by at least one processor, causes the at least one processor to carry out the functionality of radio access node 600 or a node (e.g., a processing node 700) implementing one or more of the functions 710 of the radio access node 600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
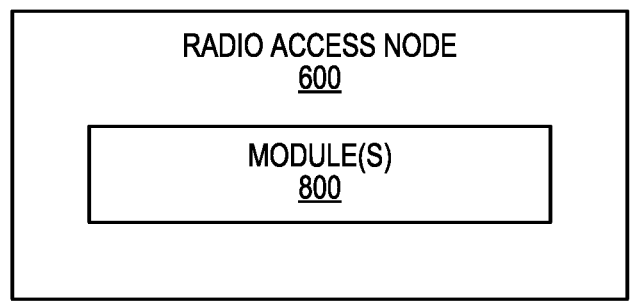

FIG. 8 is a schematic block diagram of the radio access node 600 according to some other embodiments of the present disclosure. The radio access node 600 includes one or more modules 800, each of which is implemented in software. The module(s) 800 provide the functionality of the radio access node 600 described herein. This discussion is equally applicable to the processing node 700 of FIG. 7 where the modules 800 may be implemented at one of the processing nodes 700 or distributed across multiple processing nodes 700 and/or distributed across the processing node(s) 700 and the control system 602.

Figure 9:
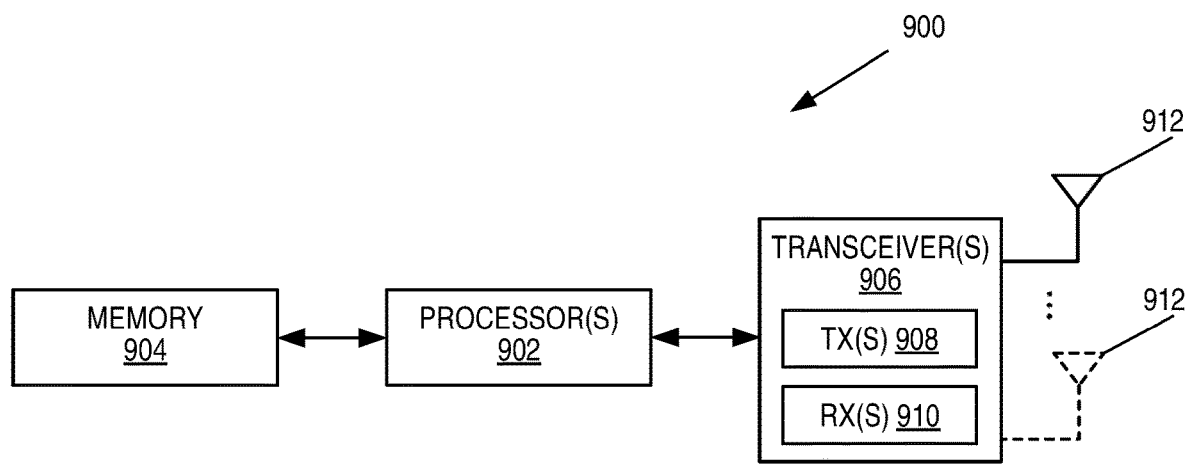
FIGS. 9 and 10 are schematic block diagrams of a UE according to some embodiments of the present disclosure.

FIG. 9 is a schematic block diagram of a UE 900 according to some embodiments of the present disclosure. As illustrated, the UE 900 includes one or more processors 902 (e.g., CPUs, ASICs, FPGAs, and/or the like), memory 904, and one or more transceivers 906 each including one or more transmitters 908 and one or more receivers 910 coupled to one or more antennas 912. The transceiver(s) 906 includes radio-front end circuitry connected to the antenna(s) 912 that is configured to condition signals communicated between the antenna(s) 912 and the processor(s) 902, as will be appreciated by on of ordinary skill in the art. The processors 902 are also referred to herein as processing circuitry. The transceivers 906 are also referred to herein as radio circuitry. In some embodiments, the functionality of the UE 900 described above may be fully or partially implemented in software that is, e.g., stored in the memory 904 and executed by the processor(s) 902. Note that the UE 900 may include additional components not illustrated in FIG. 9 such as, e.g., one or more user interface components (e.g., an input/output interface including a display, buttons, a touch screen, a microphone, a speaker(s), and/or the like and/or any other components for allowing input of information into the UE 900 and/or allowing output of information from the UE 900), a power supply (e.g., a battery and associated power circuitry), etc.

In some embodiments, a computer program including instructions which, when executed by at least one processor, causes the at least one processor to carry out the functionality of the UE 900 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
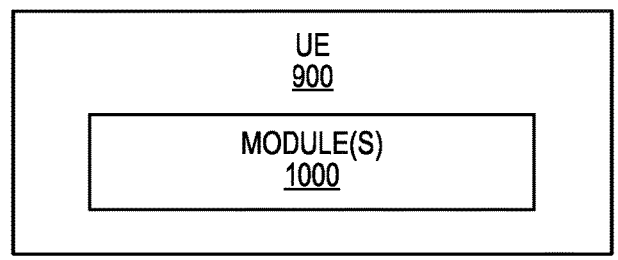

FIG. 10 is a schematic block diagram of the UE 900 according to some other embodiments of the present disclosure. The UE 900 includes one or more modules 1000, each of which is implemented in software. The module(s) 1000 provide the functionality of the UE 900 described herein.

Figure 11:
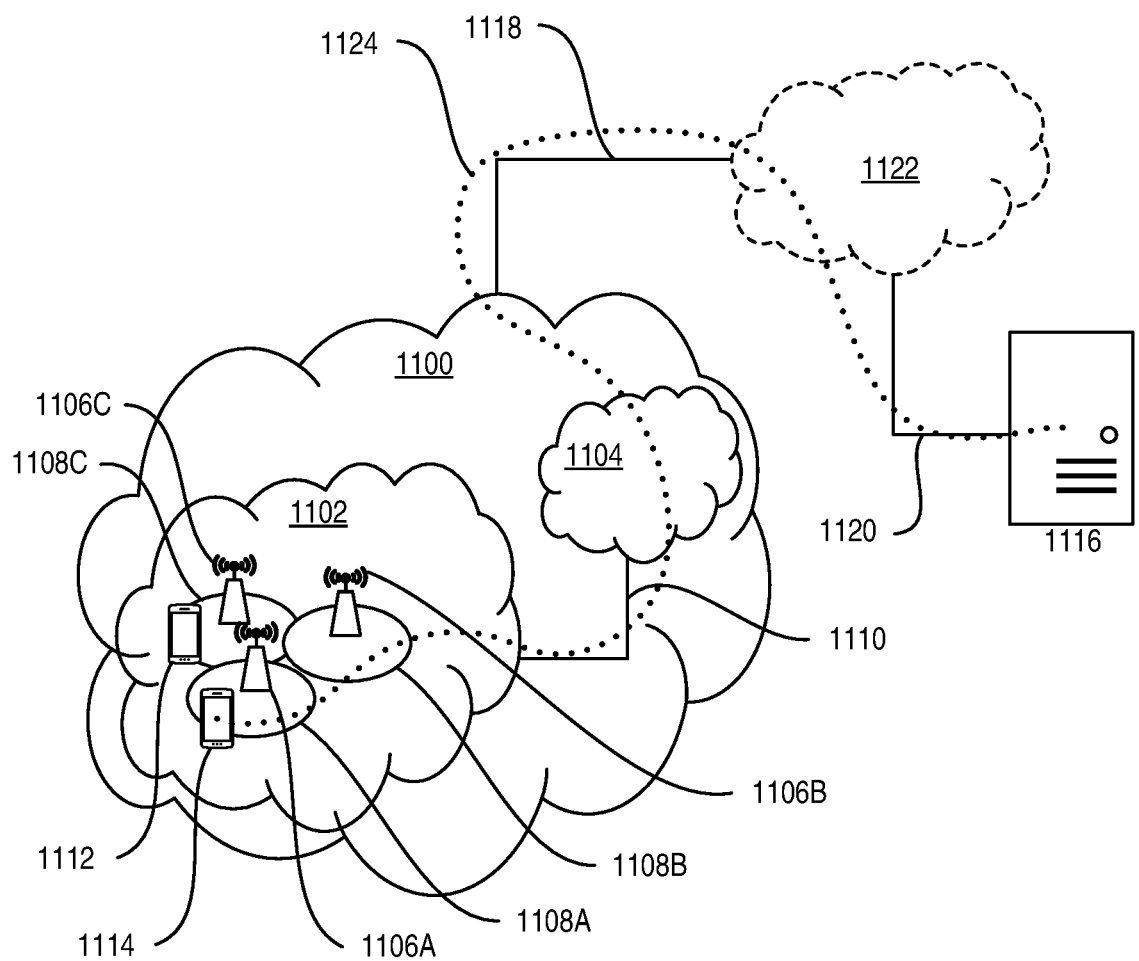
FIG. 11 illustrates an example of a communication system in which embodiments of the present disclosure may be implemented.

With reference to FIG. 11, in accordance with an embodiment, a communication system includes a telecommunication network 1100, such as a 3GPP-type cellular network, which comprises an access network 1102, such as a RAN, and a core network 1104. The access network 1102 comprises a plurality of base stations 1106A, 1106B, 1106C, such as Node Bs, eNBs, gNBs, or other types of wireless APs, each defining a corresponding coverage area 1108A, 1108B, 1108C. Each base station 1106A, 1106B, 1106C is connectable to the core network 1104 over a wired or wireless connection 1110. A first UE 1112 located in coverage area 1108C is configured to wirelessly connect to, or be paged by, the corresponding base station 1106C. A second UE 1114 in coverage area 1108A is wirelessly connectable to the corresponding base station 1106A. While a plurality of UEs 1112, 1114 are illustrated in this example, the disclosed embodiments are equally applicable to a situation where a sole UE is in the coverage area or where a sole UE is connecting to the corresponding base station 1106.

The telecommunication network 1100 is itself connected to a host computer 1116, which may be embodied in the hardware and/or software of a standalone server, a cloudimplemented server, a distributed server, or as processing resources in a server farm. The host computer 1116 may be under the ownership or control of a service provider, or may be operated by the service provider or on behalf of the service provider. Connections 1118 and 1120 between the telecommunication network 1100 and the host computer 1116 may extend directly from the core network 1104 to the host computer 1116 or may go via an optional intermediate network 1122. The intermediate network 1122 may be one of, or a combination of more than one of, a public, private, or hosted network; the intermediate network 1122, if any, may be a backbone network or the Internet; in particular, the intermediate network 1122 may comprise two or more sub-networks (not shown).

The communication system of FIG. 11 as a whole enables connectivity between the connected UEs 1112, 1114 and the host computer 1116. The connectivity may be described as an Over-the-Top (OTT) connection 1124. The host computer 1116 and the connected UEs 1112, 1114 are configured to communicate data and/or signaling via the OTT connection 1124, using the access network 1102, the core network 1104, any intermediate network 1122, and possible further infrastructure (not shown) as intermediaries. The OTT connection 1124 may be transparent in the sense that the participating communication devices through which the OTT connection 1124 passes are unaware of routing of uplink and downlink communications. For example, the base station 1106 may not or need not be informed about the past routing of an incoming downlink communication with data originating from the host computer 1116 to be forwarded (e.g., handed over) to a connected UE 1112. Similarly, the base station 1106 need not be aware of the future routing of an outgoing uplink communication originating from the UE 1112 towards the host computer 1116.

Example implementations, in accordance with an embodiment, of the UE, base station, and host computer discussed in the preceding paragraphs will now be described with reference to FIG. 12. In a communication system 1200, a host computer 1202 comprises hardware 1204 including a communication interface 1206 configured to set up and maintain a wired or wireless connection with an interface of a different communication device of the communication system 1200. The host computer 1202 further comprises processing circuitry 1208, which may have storage and/or processing capabilities. In particular, the processing circuitry 1208 may comprise one or more programmable processors, ASICs, FPGAs, or combinations of these (not shown) adapted to execute instructions. The host computer 1202 further comprises software 1210, which is stored in or accessible by the host computer 1202 and executable by the processing circuitry 1208. The software 1210 includes a host application 1212. The host application 1212 may be operable to provide a service to a remote user, such as a UE 1214 connecting via an OTT connection 1216 terminating at the UE 1214 and the host computer 1202. In providing the service to the remote user, the host application 1212 may provide user data which is transmitted using the OTT connection 1216.

The communication system 1200 further includes a base station 1218 provided in a telecommunication system and comprising hardware 1220 enabling it to communicate with the host computer 1202 and with the UE 1214. The hardware 1220 may include a communication interface 1222 for setting up and maintaining a wired or wireless connection with an interface of a different communication device of the communication system 1200, as well as a radio interface 1224 for setting up and maintaining at least a wireless connection 1226 with the UE 1214 located in a coverage area (not shown in FIG. 12) served by the base station 1218. The communication interface 1222 may be configured to facilitate a connection 1228 to the host computer 1202. The connection 1228 may be direct or it may pass through a core network (not shown in FIG. 12) of the telecommunication system and/or through one or more intermediate networks outside the telecommunication system. In the embodiment shown, the hardware 1220 of the base station 1218 further includes processing circuitry 1230, which may comprise one or more programmable processors, ASICs, FPGAs, or combinations of these (not shown) adapted to execute instructions. The base station 1218 further has software 1232 stored internally or accessible via an external connection.

The communication system 1200 further includes the UE 1214 already referred to. The UE's 1214 hardware 1234 may include a radio interface 1236 configured to set up and maintain a wireless connection 1226 with a base station serving a coverage area in which the UE 1214 is currently located. The hardware 1234 of the UE 1214 further includes processing circuitry 1238, which may comprise one or more programmable processors, ASICs, FPGAs, or combinations of these (not shown) adapted to execute instructions. The UE 1214 further comprises software 1240, which is stored in or accessible by the UE 1214 and executable by the processing circuitry 1238. The software 1240 includes a client application 1242. The client application 1242 may be operable to provide a service to a human or non-human user via the UE 1214, with the support of the host computer 1202. In the host computer 1202, the executing host application 1212 may communicate with the executing client application 1242 via the OTT connection 1216 terminating at the UE 1214 and the host computer 1202. In providing the service to the user, the client application 1242 may receive request data from the host application 1212 and provide user data in response to the request data. The OTT connection 1216 may transfer both the request data and the user data. The client application 1242 may interact with the user to generate the user data that it provides.

Figure 12:
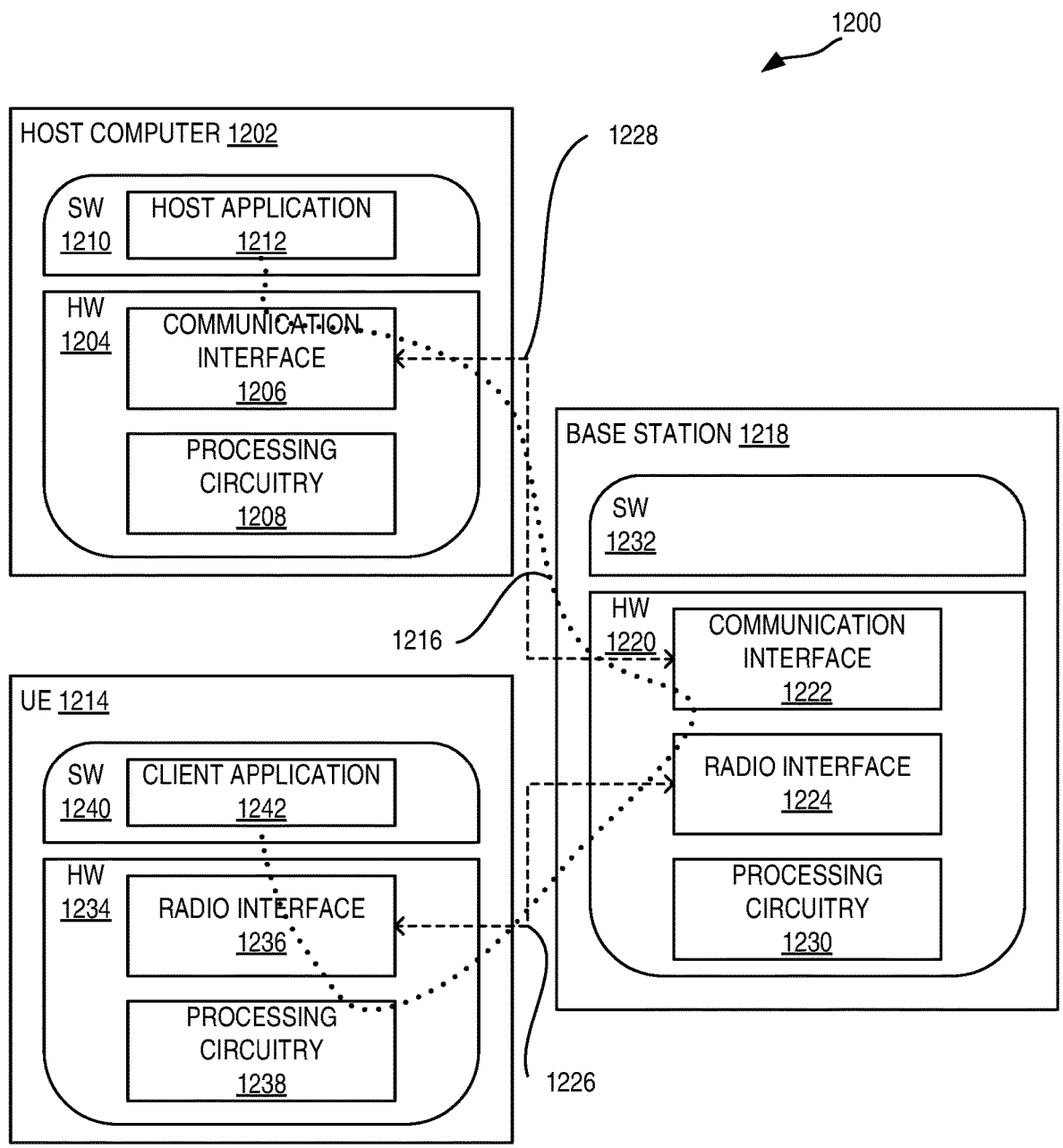
FIG. 12 illustrates example embodiments of the host computer, base station, and UE of FIG. 11.

It is noted that the host computer 1202, the base station 1218, and the UE 1214 illustrated in FIG. 12 may be similar or identical to the host computer 1116, one of the base stations 1106A, 1106B, 1106C, and one of the UEs 1112, 1114 of FIG. 11, respectively. This is to say, the inner workings of these entities may be as shown in FIG. 12 and independently, the surrounding network topology may be that of FIG. 11.

In FIG. 12, the OTT connection 1216 has been drawn abstractly to illustrate the communication between the host computer 1202 and the UE 1214 via the base station 1218 without explicit reference to any intermediary devices and the precise routing of messages via these devices. The network infrastructure may determine the routing, which may be configured to hide from the UE 1214 or from the service provider operating the host computer 1202, or both. While the OTT connection 1216 is active, the network infrastructure may further take decisions by which it dynamically changes the routing (e.g., on the basis of load balancing consideration or reconfiguration of the network).

The wireless connection 1226 between the UE 1214 and the base station 1218 is in accordance with the teachings of the embodiments described throughout this disclosure. One or more of the various embodiments improve the performance of OTT services provided to the UE 1214 using the OTT connection 1216, in which the wireless connection 1226 forms the last segment.

A measurement procedure may be provided for the purpose of monitoring data rate, latency, and other factors on which the one or more embodiments improve. There may further be an optional network functionality for reconfiguring the OTT connection 1216 between the host computer 1202 and the UE 1214, in response to variations in the measurement results. The measurement procedure and/or the network functionality for reconfiguring the OTT connection 1216 may be implemented in the software 1210 and the hardware 1204 of the host computer 1202 or in the software 1240 and the hardware 1234 of the UE 1214, or both. In some embodiments, sensors (not shown) may be deployed in or in association with communication devices through which the OTT connection 1216 passes; the sensors may participate in the measurement procedure by supplying values of the monitored quantities exemplified above, or supplying values of other physical quantities from which the software 1210, 1240 may compute or estimate the monitored quantities. The reconfiguring of the OTT connection 1216 may include message format, retransmission settings, preferred routing, etc.; the reconfiguring need not affect the base station 1218, and it may be unknown or imperceptible to the base station 1218. Such procedures and functionalities may be known and practiced in the art. In certain embodiments, measurements may involve proprietary UE signaling facilitating the host computer 1202's measurements of throughput, propagation times, latency, and the like. The measurements may be implemented in that the software 1210 and 1240 causes messages to be transmitted, in particular empty or 'dummy' messages, using the OTT connection 1216 while it monitors propagation times, errors, etc.

FIG. 13 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 13 will be included in this section. In step 1300, the host computer provides user data. In sub-step 1302 (which may be optional) of step 1300, the host computer provides the user data by executing a host application. In step 1304, the host computer initiates a transmission carrying the user data to the UE. In step 1306 (which may be optional), the base station transmits to the UE the user data which was carried in the transmission that the host computer initiated, in accordance with the teachings of the embodiments described throughout this disclosure. In step 1308 (which may also be optional), the UE executes a client application associated with the host application executed by the host computer.

FIG. 14 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 14 will be included in this section. In step 1400 of the method, the host computer provides user data. In an optional sub-step (not shown) the host computer provides the user data by executing a host application. In step 1402, the host computer initiates a transmission carrying the user data to the UE. The transmission may pass via the base station, in accordance with the teachings of the embodiments described throughout this disclosure. In step 1404 (which may be optional), the UE receives the user data carried in the transmission.

FIG. 15 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 15 will be included in this section. In step 1500 (which may be optional), the UE receives input data provided by the host computer. Additionally or alternatively, in step 1502, the UE provides user data. In sub-step 1504 (which may be optional) of step 1500, the UE provides the user data by executing a client application. In sub-step 1506 (which may be optional) of step 1502, the UE executes a client application which provides the user data in reaction to the received input data provided by the host computer. In providing the user data, the executed client application may further consider user input received from the user. Regardless of the specific manner in which the user data was provided, the UE initiates, in sub-step 1508 (which may be optional), transmission of the user data to the host computer. In step 1510 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 16 will be included in this section. In step 1600 (which may be optional), in accordance with the teachings of the embodiments described throughout this disclosure, the base station receives user data from the UE. In step 1602 (which may be optional), the base station initiates transmission of the received user data to the host computer. In step 1604 (which may be optional), the host computer receives the user data carried in the transmission initiated by the base station.

Figure 17:
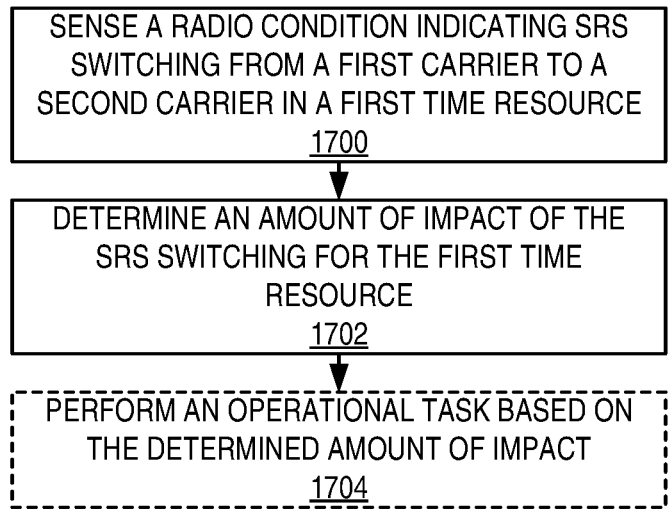
FIG. 17 is a flow chart that illustrates the operation of a UE in accordance with some embodiments of the present disclosure.

FIG. 17 depicts a method in accordance with particular embodiments. Dashed boxes represent optional steps. This method may be performed by a UE. The method begins at step 1700 with sensing a radio condition indicating SRS switching from a first carrier to a second carrier in a first time resource. In other words, the UE determines that SRS carrier-based switching from the first carrier to the second carrier occurs. This may be done in advance (e.g., determines at time X that the SRS carrier-based switching will occur at time Y, which is after time X), or may be done as the SRS carrier-based switching occurs. Further, as discussed above, the first carrier is preferably a carrier on which a first serving cell of the UE operates (e.g., a first serving cell in a first cell group), and the second carrier is preferably a carrier on which a second serving cell of the UE operates (e.g., a second serving cell in a second cell group). At least one of the first carrier and the second carrier has a flexible SCS, such as described above with respect to FIGS. 3-5.

The method also includes step 1702 with determining an amount of impact of the SRS switching for the first time resource. As discussed above, the amount of impact of the SRS switching may be the amount of impact on one or more serving cells of the UE as a result of the SRS switching. As discussed above, in some embodiments, the first carrier is a carrier on which a first serving cell of the UE operates where the first serving cell is in a first cell group, and the second carrier is a carrier on which a second serving cell of the UE operates where the second serving cell is in a second cell group. In this case, the one or more serving cells impacted by the SRS switching may include one or more cells in the first cell group (e.g., other than the first serving cell) and/or one or more cells in the second cell group (e.g., other than the second serving cell). The amount of impact may be determined in a manner such as described in Methods for Determining the Impact of SRS Switching and/or Specific Examples of Determining the Impact of SRS Switching, above.

In some examples, the method may optionally include step 1704 with performing an operational task based on the determined amount of impact. For example, the operational task can include at least one of determining an applicable RRM requirement or determining performance of the UE while performing SRS switching. The operational task can additionally or alternatively include compensating for the determined amount of impact, adapting operation of the UE to reduce the amount of impact, avoiding the determined amount of impact, or scheduling operational tasks of the UE to reduce overlap with the first time resource, such as described in Methods for Compensating for or Avoiding SRS Switching Impact on UE Operational Task, above.

Figure 18:
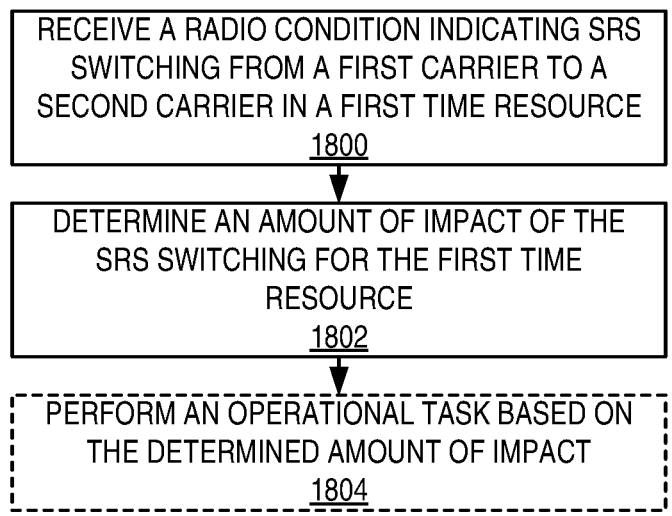
FIG. 18 is a flow chart that illustrates the operation of a base station in accordance with some embodiments of the present disclosure.

FIG. 18 depicts a method in accordance with particular embodiments. Dashed boxes represent optional steps. This method may be performed by a network node (e.g., base station). The method begins at step 1800 with receiving a radio condition from a wireless device (e.g., a UE) indicating SRS switching from a first carrier to a second carrier in a first time resource. In other words, the network node determines that SRS carrier-based switching from the first carrier to the second carrier occurs. This may be done in advance (e.g., determines at time X that the SRS carrier-based switching will occur at time Y, which is after time X), or may be done at as the SRS carrier-based switching occurs. Further, as discussed above, the first carrier is preferably a carrier on which a first serving cell of the wireless device operates (e.g., a first serving cell in a first cell group), and the second carrier is preferably a carrier on which a second serving cell of the wireless device operates (e.g., a second serving cell in a second cell group). At least one of the first carrier and the second carrier has a flexible SCS, such as described above with respect to FIGS. 3-5.

The method also includes step 1802 with determining an amount of impact of the SRS switching for the first time resource. As discussed above, the amount of impact of the SRS switching may be the amount of impact on one or more serving cells of the wireless device as a result of the SRS switching. As discussed above, in some embodiments, the first carrier is a carrier on which a first serving cell of the wireless device operates where the first serving cell is in a first cell group, and the second carrier is a carrier on which a second serving cell of the wireless device operates where the second serving cell is in a second cell group. In this case, the one or more serving cells impacted by the SRS switching may include one or more cells in the first cell group (e.g., other than the first serving cell) and/or one or more cells in the second cell group (e.g., other than the second serving cell). The amount of impact may be determined in a manner such as described in Methods for Determining the Impact of SRS Switching and/or Specific Examples of Determining the Impact of SRS Switching, above.

In some examples, the method may optionally include step 1704 with performing an operational task based on the determined amount of impact. For example, the operational task can include at least one of determining an applicable RRM requirement for the wireless device or determining performance of the wireless device while performing SRS switching. The operational task can additionally or alternatively include compensating for the determined amount of impact, adapting operation of the wireless device to reduce the amount of impact, avoiding the determined amount of impact, or scheduling operational tasks of the wireless device to reduce overlap with the first time resource, such as described in Methods for Compensating for or Avoiding SRS Switching Impact on UE Operational Task, above.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

One example implementation of at least some aspects of the embodiments described herein is provided below as changes to 3GPP Technical Specification (TS) 38.133 V15.4.0.

8.2.1 NSA: Interruptions with EN-DC
8.2.1.1 Introduction
This section contains the requirements related to the interruptions on PSCell and SCell, when
- E-UTRA PCell transitions between active and non-active during DRX, or
- E-UTRA PCell transitions from non-DRX to DRX, or
- E-UTRA SCell in MCG or SCell in SCG is added or released, or
- E-UTRA SCell in MCG or SCell in SCG is activated or deactivated, or measurements on SCC with deactivated SCell in either E-UTRA MCG or NR SCG, or
- SRS carrier-based switching is performed between NR carriers, or
- SRS carrier-based switching is performed between E-UTRAN carriers, or
- SRS carrier-based switching is performed between NR carriers and between E-UTRAN carriers.

This section also contains the requirements related to the interruptions on other active serving cells in the same frequency range wherein the UE is performing BWP switching.

The requirements shall apply for E-UTRA-NR DC with an E-UTRA PCell.

This section contains interruptions where victim cell is PSCell or SCell belonging to SCG. Requirements for interruptions requirements when the victim cell is E-UTRA PCell or E-UTRA SCell belonging to MCG are specified in [15]. For a UE which does not support per-FR measurement gaps, interruptions to the PSCell or active SCG SCells may be caused by EUTRA PCell, EUTRA SCells or SCells on any frequency range. For UE which support per-FR gaps, interruptions to the PSCell or active SCG SCells may be caused by EUTRA PCell, EUTRA SCells or SCells on the same frequency range as the victim cell.

8.2.1.2 Requirements
8.2.1.2.8 Interruptions at SRS Carrier-Based Switching Between NR Carriers A PUSCH-less SCell is a TDD SCell without PUCCH/PUSCH configured. When a UE needs to transmit periodic or aperiodic SRS [6] and/or non-contention based PRACH on a PUSCH-less SCell, the UE can perform carrier-based switching to one or more CCs with PUSCH-less SCells from a CC with PUSCH or from another CC with PUSCH-less SCell prior to transmitting SRS and/or PRACH, provided that:

SRS switching is performed between NR carriers: from a configured CC to another CC with activated TDD CC;
the CCs with PUSCH-less SCells to which SRS carrier-based switching is performed is indicated by DCI SRS request field for aperiodic SRS transmission or configured via RRC [2] for periodic SRS transmission or indicated by PDCCH for PRACH;
the serving cell, from which SRS carrier-based switching is performed and whose UL transmission may therefore be interrupted, is indicated by srs-SwitchFromServCellIndex [2],
other conditions are FFS.

The UE shall not perform SRS carrier-based switching if the above conditions cannot be met.

When performing SRS carrier-based switching the UE shall meet the following interruptions requirements:

The interruption on PSCell and each of the activated SCells during the switching to the PUSCH-less SCell shall not exceed $2^\mu$ slots including the first slot where SRS transmission is configured on the PUSCH-less SCell, where $\mu$ is defined in TS 38.211 [6, Section 4.2] and determined by the SCS of the victim serving cell (PSCell or the activated SCell) immediately before the switching, provided that the victim serving cell and the PUSCH-less SCell are aligned within [TBD], The interruption on PSCell and each of the activated SCells during the switching to the PUSCH-less SCell shall not exceed $2^\mu$ slots+TBD including the first slot where SRS transmission is configured on the PUSCH-less SCell, where $\mu$ is defined in TS 38.211 [6, Section 4.2] and determined by the SCS of the victim serving cell (PSCell or the activated SCell) immediately before the switching, provided that the victim serving cell and the PUSCH-less SCell are aligned within more than [TBD], The interruption on PSCell and each of the activated SCells during the switching from the PUSCH-less SCell shall not exceed $2^\mu$ slots including the last slot where SRS transmission is configured on the PUSCH-less SCell, where $\mu$ is defined in TS 38.211 [6, Section 4.2] and determined by the SCS of the victim serving cell (PSCell or the activated SCell) immediately before the switching, provided that the victim serving cell and the PUSCH-less SCell are aligned within [TBD].

The interruption on PSCell and each of the activated SCells during the switching from the PUSCH-less SCell shall not exceed $2^\mu$ slots+TBD including the last slot where SRS transmission is configured on the PUSCH-less SCell, where $\mu$ is defined in TS 38.211 [6, Section 4.2] and determined by the SCS of the victim serving cell (PSCell or the activated SCell) immediately before the switching, provided that the victim serving cell and the PUSCH-less SCell are aligned within more than [TBD].

NOTE: interruptions requirements on E-UTRAN PCell and E-UTRAN SCells in EN-DC due to the SRS switching between the NR carriers are defined in TS 36.133 [15].

8.2.1.2.9 Interruptions at SRS Carrier-Based Switching Between E-UTRAN Carriers
Editor's note: requirements are TBD.
NOTE: interruptions requirements on E-UTRAN PCell and E-UTRAN SCells in EN-DC due to the SRS switching between the E-UTRAN carriers are defined in TS 36.133 [15].

8.2.1.2.10 Interruptions at SRS Carrier-Based Switching Between NR Carriers and Between E-UTRAN Carriers
Editor's note: requirements are TBD.
NOTE: interruptions requirements on E-UTRAN PCell and E-UTRAN SCells in EN-DC due to the SRS switching between the NR carriers and between the E-UTRAN carriers are defined in TS 36.133 [15].

8.2.2 SA: Interruptions with Standalone NR Carrier Aggregation
8.2.2.1 Introduction
This section contains the requirements related to the interruptions on PCell and activated SCell if configured, when up to TBD SCells are configured, deconfigured, activated or deactivated.

Note: interruptions at SCell addition/release, activation/deactivation and during measurements on SCC may not be required by all UEs.
Editor's Note: The interruptions shall not interrupt RRC signalling or ACK/NACKs related to RRC reconfiguration procedure [2] for SCell addition/release or MAC control signalling [17] for SCell activation/deactivation command How to specify this is FFS.

This section also contains the requirements related to the interruptions on PCell and activated SCell when SRS carrier-based switching is performed between NR carriers.

This section also contains the requirements related to the interruptions on other active serving cells in the same frequency range wherein the UE is performing BWP switching.

For a UE which does not support per-FR measurement gaps, interruptions to the PCell and activated SCell may be caused by SCells on any frequency range. For UE which support per-FR gaps, interruptions to PCell and activated SCell may be caused by SCells on the same frequency range as the victim cell.

8.2.2.2 Requirements
8.2.2.2.6 Interruptions at SRS Carrier-Based Switching Between NR Carriers A PUSCH-less SCell is a TDD SCell without PUCCH/PUSCH configured. When a UE needs to transmit periodic or aperiodic SRS [6] and/or non-contention based PRACH on a PUSCH-less SCell, the UE can perform carrier-based switching to one or more CCs with PUSCH-less SCells from a CC with PUSCH or from another CC with PUSCH-less SCell prior to transmitting SRS and/or PRACH, provided that:

SRS switching is performed between NR carriers: from a configured CC to another CC with activated TDD CC;
the CCs with PUSCH-less SCells to which SRS carrier-based switching is performed is indicated by DCI SRS request field for aperiodic SRS transmission or configured via RRC [2] for periodic SRS transmission or indicated by PDCCH for PRACH;

the serving cell, from which SRS carrier-based switching is performed and whose UL transmission may therefore be interrupted, is indicated by srs-SwitchFromServCellIndex [2], other conditions are FFS.

The UE shall not perform SRS carrier-based switching if the above conditions cannot be met.

When performing SRS carrier-based switching the UE shall meet the following interruptions requirements:

The interruption on PCell and each of the activated SCells during the switching to the PUSCH-less SCell shall not exceed $2^\mu$ slots including the first slot where SRS transmission is configured on the PUSCH-less SCell, where $\mu$ is defined in TS 38.211 [6, Section 4.2] and determined by the SCS of the victim serving cell (PCell or the activated SCell) immediately before the switching, provided that the victim serving cell and the PUSCH-less SCell are aligned within [TBD], The interruption on PCell and each of the activated SCells during the switching to the PUSCH-less SCell shall not exceed $2^\mu$ slots+TBD including the first slot where SRS transmission is configured on the PUSCH-less SCell, where $\mu$ is defined in TS 38.211 [6, Section 4.2] and determined by the SCS of the victim serving cell (PCell or the activated SCell) immediately before the switching, provided that the victim serving cell and the PUSCH-less SCell are aligned within more than [TBD], The interruption on PCell and each of the activated SCells during the switching from the PUSCH-less SCell shall not exceed $2^\mu$ slots including the last slot where SRS transmission is configured on the PUSCH-less SCell, where $\mu$ is defined in TS 38.211 [6, Section 4.2] and determined by the SCS of the victim serving cell (PCell or the activated SCell) immediately before the switching, provided that the victim serving cell and the PUSCH-less SCell are aligned within [TBD].

The interruption on PCell and each of the activated SCells during the switching from the PUSCH-less SCell shall not exceed $2^\mu$ slots+TBD including the last slot where SRS transmission is configured on the PUSCH-less SCell, where $\mu$ is defined in TS 38.211 [6, Section 4.2] and determined by the SCS of the victim serving cell (PCell or the activated SCell) immediately before the switching, provided that the victim serving cell and the PUSCH-less SCell are aligned within more than [TBD].

8.2.3 Interruptions with NR-DC 8.2.3.1 Introduction

This section contains the requirements related to the interruptions on PCell, PSCell and SCell, when SRS carrier-based switching is performed between NR carriers, or

[TBD].

The requirements shall apply for NR-DC.

8.2.3.2 Requirements 8.2.3.2.1 Interruptions at SRS Carrier-Based Switching Between NR Carriers A PUSCH-less SCell is a TDD SCell without PUCCH/PUSCH configured. When a UE needs to transmit periodic or aperiodic SRS [6] and/or non-contention based PRACH on a PUSCH-less SCell, the UE can perform carrier-based switching to one or more CCs with PUSCH-less SCells from a CC with PUSCH or from another CC with PUSCH-less SCell prior to transmitting SRS and/or PRACH, provided that:

SRS switching is performed between NR carriers: from a configured CC to another CC with activated TDD CC;

the CCs with PUSCH-less SCells to which SRS carrier-based switching is performed is indicated by DCI SRS request field for aperiodic SRS transmission or configured via RRC [2] for periodic SRS transmission or indicated by PDCCH for PRACH;

the serving cell, from which SRS carrier-based switching is performed and whose UL transmission may therefore be interrupted, is indicated by srs-SwitchFromServCellIndex [2], other conditions are FFS.

The UE shall not perform SRS carrier-based switching if the above conditions cannot be met.

When performing SRS carrier-based switching the UE shall meet the following interruptions requirements:

The interruption on PCell, PSCell and each of the activated SCells during the switching to the PUSCH-less SCell shall not exceed $2^\mu$ slots including the first slot where SRS transmission is configured on the PUSCH-less SCell, where $\mu$ is defined in TS 38.211 [6, Section 4.2] and determined by the SCS of the victim serving cell (PCell, PSCell or the activated SCell) immediately before the switching, provided that the victim serving cell and the PUSCH-less SCell are aligned within [TBD], The interruption on PCell, PSCell and each of the activated SCells during the switching to the PUSCH-less SCell shall not exceed $2^\mu$ slots+TBD including the first slot where SRS transmission is configured on the PUSCH-less SCell, where $\mu$ is defined in TS 38.211 [6, Section 4.2] and determined by the SCS of the victim serving cell (PCell, PSCell or the activated SCell) immediately before the switching, provided that the victim serving cell and the PUSCH-less SCell are aligned within more than [TBD], The interruption on PCell, PSCell and each of the activated SCells during the switching from the PUSCH-less SCell shall not exceed $2^\mu$ slots including the last slot where SRS transmission is configured on the PUSCH-less SCell, where $\mu$ is defined in TS 38.211 [6, Section 4.2] and determined by the SCS of the victim serving cell (PCell, PSCell or the activated SCell) immediately before the switching, provided that the victim serving cell and the PUSCH-less SCell are aligned within [TBD].

The interruption on PCell, PSCell and each of the activated SCells during the switching from the PUSCH-less SCell shall not exceed $2^\mu$ slots+TBD including the last slot where SRS transmission is configured on the PUSCH-less SCell, where $\mu$ is defined in TS 38.211 [6, Section 4.2] and determined by the SCS of the victim serving cell (PCell, PSCell or the activated SCell) immediately before the switching, provided that the victim serving cell and the PUSCH-less SCell are aligned within more than [TBD].

8.2.4 Interruptions with NE-DC 8.2.4.1 Introduction

This section contains the requirements related to the interruptions on PCell and SCell, when SRS carrier-based switching is performed between NR carriers, or SRS carrier-based switching is performed between E-UTRAN carriers, or SRS carrier-based switching is performed between NR carriers and between E-UTRAN carriers, or

[TBD].

The requirements shall apply for NE-DC.

8.2.4.2 Requirements
8.2.4.2.1 Interruptions at SRS Carrier-Based Switching Between NR Carriers A PUSCH-less SCell is a TDD SCell without PUCCH/PUSCH configured. When a UE needs to transmit periodic or aperiodic SRS [6] and/or non-contention based PRACH on a PUSCH-less SCell, the UE can perform carrier-based switching to one or more CCs with PUSCH-less SCells from a CC with PUSCH or from another CC with PUSCH-less SCell prior to transmitting SRS and/or PRACH, provided that:

- SRS switching is performed between NR carriers: from a configured CC to another CC with activated TDD CC;
- the CCs with PUSCH-less SCells to which SRS carrier-based switching is performed is indicated by DCI SRS request field for aperiodic SRS transmission or configured via RRC [2] for periodic SRS transmission or indicated by PDCCH for PRACH;
- the serving cell, from which SRS carrier-based switching is performed and whose UL transmission may therefore be interrupted, is indicated by srs-SwitchFromServCellIndex [2],
- other conditions are FFS.

The UE shall not perform SRS carrier-based switching if the above conditions cannot be met.

When performing SRS carrier-based switching the UE shall meet the following interruptions requirements:

- The interruption on PCell and each of the activated SCells during the switching to the PUSCH-less SCell shall not exceed $2^\mu$ slots including the first slot where SRS transmission is configured on the PUSCH-less SCell, where $\mu$ is defined in TS 38.211 [6, Section 4.2] and determined by the SCS of the victim serving cell (PCell or activated SCell) immediately before the switching, provided that the victim serving cell and the PUSCH-less SCell are aligned within [TBD],
- The interruption on PCell and each of the activated SCells during the switching to the PUSCH-less SCell shall not exceed $2^\mu$ slots+TBD including the first slot where SRS transmission is configured on the PUSCH-less SCell, where $\mu$ is defined in TS 38.211 [6, Section 4.2] and determined by the SCS of the victim serving cell (PCell or activated SCell) immediately before the switching, provided that the victim serving cell and the PUSCH-less SCell are aligned within more than [TBD],
- The interruption on PCell and each of the activated SCells during the switching from the PUSCH-less SCell shall not exceed $2^\mu$ slots including the last slot where SRS transmission is configured on the PUSCH-less SCell, where $\mu$ is defined in TS 38.211 [6, Section 4.2] and determined by the SCS of the victim serving cell (PCell or activated SCell) immediately before the switching, provided that the victim serving cell and the PUSCH-less SCell are aligned within [TBD].
- The interruption on PCell and each of the activated SCells during the switching from the PUSCH-less SCell shall not exceed $2^\mu$ slots+TBD including the last slot where SRS transmission is configured on the PUSCH-less SCell, where $\mu$ is defined in TS 38.211 [6, Section 4.2] and determined by the SCS of the victim serving cell (PCell or activated SCell) immediately before the switching, provided that the victim serving cell and the PUSCH-less SCell are aligned within more than [TBD].

NOTE: interruptions requirements on E-UTRAN PSCell and E-UTRAN SCells in NE-DC due to the SRS switching between the NR carriers are defined in TS 36.133 [15].

8.2.4.2.2 Interruptions at SRS Carrier-Based Switching Between E-UTRAN Carriers Editor's note: requirements are TBD.

NOTE: interruptions requirements on E-UTRAN PSCell and E-UTRAN SCells in NE-DC due to the SRS switching between the E-UTRAN carriers are defined in TS 36.133 [15].

8.2.4.2.3 Interruptions at SRS Carrier-Based Switching Between NR Carriers and Between E-UTRAN Carriers Editor's note: requirements are TBD.

NOTE: interruptions requirements on E-UTRAN PSCell and E-UTRAN SCells in NE-DC due to the SRS switching between the E-UTRAN carriers and between the NR carriers are defined in TS 36.133 [15].

Another example implementation of at least some aspects of the embodiments described herein is provided below as changes to 3GPP TS 36.133 V15.5.0.

7.32 Interruptions with EN-DC
7.32.1 Introduction

This section contains the requirements related to the interruptions on PCell, and MCG SCell when

- NR PSCell is added or released, or
- transitions between active and non-active during NR PSCell DRX, or
- transitions from NR PSCell non-DRX to DRX, or
- SCell in either E-UTRA MCG or NR SCG is added or released, or
- SCell in either E-UTRA MCG or NR SCG is activated or deactivated, or
- measurements on SCC with deactivated SCell in either E-UTRA MCG or NR SCG, or
- a downlink bandwidth part (BWP) and/or an uplink BWP is switched in NR PSCell or in any NR SCell, or
- SRS carrier-based switching is performed between E-UTRAN carriers, or
- SRS carrier-based switching is performed between NR carriers, or
- SRS carrier-based switching is performed between E-UTRAN carriers and between NR carriers.

The requirements shall apply for EN-DC.

This section contains interruption requirements when the victim cell is PCell or SCell belonging to MCG. Requirements for interruptions where victim cell is the NR PSCell or an NR SCell belonging to SCG are specified in [50].

For a UE which does not support per-FR measurement gaps, interruptions to the PCell or active MCG SCells may be caused by NR PSCell or NR SCells on any frequency range. For UE which support per-FR gaps, interruptions to the PCell or active MCG SCells may be caused by NR PSCell or NR SCells on FR1 only.

7.32.2 Requirements
7.32.2.8 Interruptions at SRS Carrier-Based Switching Between E-UTRAN Carriers A PUSCH-less SCell is a TDD SCell without PUCCH/PUSCH configured. When a UE needs to transmit periodic or aperiodic SRS [16] and/or non-contention based PRACH on a PUSCH-less SCell, the UE can perform SRS carrier-based switching to one or more CCs with PUSCH-less SCells from a CC with PUSCH or from another CC with PUSCH-less SCell prior to transmitting SRS and/or PRACH, provided that:

- switching is between E-UTRAN carriers: from a configured CC to another CC with activated TDD SCell;

the CCs with PUSCH-less SCells to which SRS carrier-based switching is performed is indicated by DCI SRS request field for aperiodic SRS transmission or configured via RRC [2] for periodic SRS transmission or indicated by PDCCH for PRACH;

the serving cell, from which SRS carrier-based switching is performed and whose UL transmission may therefore be interrupted, is indicated by srs-SwitchFromServCellIndex [2], the SRS switching is not colliding with any other transmission with higher priority defined in [3];

the SRS switching is not colliding with PDCCH in subframe 0 and 5 as specified in [3];

for UE, which does not support simultaneous reception and transmission for inter-band TDD CA specified in TS 36.331 [2], and is compliant to the requirements for inter-band CA with uplink in one E-UTRA band and without simultaneous Rx/Tx specified in TS 36.101 [5], the SRS or RACH transmission are not simultaneously scheduled with DL subframe #0 or DL subframe #5 on other CCs.

The UE shall not perform SRS carrier-based switching if the above conditions cannot be met.

When performing SRS carrier-based switching the UE shall meet the following interruptions requirements:

The interruption on PCell and each of the activated SCells during the switching to the PUSCH-less SCell shall not exceed 2 subframes including the first subframe where SRS transmission is configured on the PUSCH-less SCell.

The interruption on PCell and each of the activated SCells during the switching from the PUSCH-less SCell shall not exceed 2 subframes including the last subframe where SRS transmission is configured on the PUSCH-less SCell.

NOTE: interruptions requirements on NR PSCell and NR SCells in EN-DC due to the SRS switching between the E-UTRAN carriers are defined in TS 38.133 [50].

7.32.2.9 Interruptions at SRS Carrier-Based Switching Between NR Carriers

A PUSCH-less SCell is a TDD SCell without PUCCH/PUSCH configured. When a UE needs to transmit periodic or aperiodic NR SRS [42] and/or non-contention based PRACH on a PUSCH-less SCell, the UE can perform SRS carrier-based switching to one or more CCs with NR PUSCH-less SCells from an NR CC with PUSCH or from another CC with NR PUSCH-less SCell prior to transmitting SRS and/or PRACH, provided that:

switching is between NR carriers: from a configured CC to another activated TDD SCell;

other conditions are TBD.

The UE shall not perform SRS carrier-based switching if the above conditions cannot be met.

When performing SRS carrier-based switching the UE shall meet the following interruptions requirements:

Editor's note: requirements are TBD.

NOTE: interruptions requirements on NR PCell and NR SCells in EN-DC due to the SRS switching between the NR carriers are defined in TS 38.133 [50].

7.32.2.10 Interruptions at SRS Carrier-Based Switching Between E-UTRAN Carriers and Between NR Carriers Editor's note: requirements are TBD.

NOTE: interruptions requirements on NR PSCell and NR SCells in EN-DC due to the SRS switching between E-UTRAN carriers and between the NR carriers are defined in TS 38.133 [50].

7.36 Interruptions with NE-DC
7.36.1 Introduction
This section contains the requirements related to the interruptions on PSCell and SCell when SRS carrier-based switching is performed between E-UTRAN carriers, or SRS carrier-based switching is performed between NR carriers, or SRS carrier-based switching is performed between E-UTRAN carriers and between NR carriers, or

[TBD].

The requirements shall apply for NE-DC.

7.36.2 Requirements
7.36.2.1 Interruptions at SRS Carrier-Based Switching Between E-UTRAN Carriers A PUSCH-less SCell is a TDD SCC without PUCCH/PUSCH configured. When a UE needs to transmit periodic or aperiodic SRS [16] and/or non-contention based PRACH on a PUSCH-less SCell, the UE can perform carrier-based switching to one or more CCs with PUSCH-less SCells from a CC with PUSCH or from another PUSCH-less SCell prior to transmitting SRS and/or PRACH, provided that:

switching is between E-UTRAN carriers: from a configured CC to another CC with activated TDD SCell;

the CC with PUSCH-less SCells to which SRS carrier-based switching is performed is indicated by DCI SRS request field for aperiodic SRS transmission or configured via RRC [2] for periodic SRS transmission or indicated by PDCCH for PRACH;

the serving cell, from which SRS carrier-based switching is performed and whose UL transmission may therefore be interrupted, is indicated by srs-SwitchFromServCellIndex [2], the SRS switching is not colliding with any other transmission with higher priority defined in [3];

the SRS switching is not colliding with PDCCH in subframe 0 and 5 as specified in [3];

for UE, which does not support simultaneous reception and transmission for inter-band TDD CA specified in TS 36.331 [2], and is compliant to the requirements for inter-band CA with uplink in one E-UTRA band and without simultaneous Rx/Tx specified in TS 36.101 [5], the SRS or RACH transmission are not simultaneously scheduled with DL subframe #0 or DL subframe #5 on other CCs.

The UE shall not perform SRS carrier-based switching if the above conditions cannot be met.

When performing SRS carrier-based switching the UE shall meet the following interruptions requirements:

The interruption on PSCell and each of the activated SCells during the switching to the PUSCH-less SCell shall not exceed 2 subframes including the first subframe where SRS transmission is configured on the PUSCH-less SCell.

The interruption on PSCell and each of the activated SCells during the switching from the PUSCH-less SCell shall not exceed 2 subframes including the last subframe where SRS transmission is configured on the PUSCH-less SCell.

NOTE: interruptions requirements on NR PCell and NR SCells in NE-DC due to the SRS switching between the E-UTRAN carriers are defined in TS 38.133 [50].

7.36.2.2 Interruptions at SRS Carrier-Based Switching Between NR Carriers

A PUSCH-less SCell is a TDD SCC without PUCCH/PUSCH configured. When a UE needs to transmit periodic or aperiodic NR SRS [42] and/or non-contention based PRACH on a PUSCH-less SCell, the UE can perform carrier-based switching to one or more NR CCs with PUSCH-less SCells from an NR CC with PUSCH or from another NR CC with PUSCH-less SCell prior to transmitting SRS and/or PRACH, provided that:
 switching is between NR carriers: from a configured CC to another CC with activated TDD CC;
 other conditions are TBD.
The UE shall not perform SRS carrier-based switching if the above conditions cannot be met.
When performing SRS carrier-based switching the UE shall meet the following interruptions requirements:
 Editor's note: requirements are TBD.
 NOTE: interruptions requirements on NR PCell and NR SCells in NE-DC due to the SRS switching between the NR carriers are defined in TS 38.133 [50].
7.36.2.3 Interruptions at SRS Carrier-Based Switching Between E-UTRAN Carriers and Between NR Carriers
Editor's note: requirements are TBD.
NOTE: interruptions requirements on NR PCell and NR SCells in NE-DC due to the SRS switching between E-UTRAN carriers and between the NR carriers are defined in TS 38.133 [50].

Some example embodiments of the present disclosure are as follows.

Group A Embodiments

Embodiment 1: A method performed by a wireless device for controlling sounding reference signal (SRS) switching impact, the method comprising: sensing a radio condition indicating SRS switching from a first carrier to a second carrier in a first time resource; and determining an amount of impact of the SRS switching for the first time resource; wherein at least one of the first carrier and the second carrier has a flexible subcarrier spacing (SCS).

Embodiment 1.1: The method of embodiment 1, further comprising: performing a first action when the determined amount of impact is below a threshold; and performing a second action when the determined amount of impact is not below the threshold.

Embodiment 1.2: The method of embodiment 1, further comprising utilizing the determined amount of impact to: determine an applicable UE RRM requirement the wireless device is required to meet; determining a performance of the wireless device when the wireless device performs SRS switching; compensating for the determined amount of impact; adapting operation to reduce the impact of SRS switching on performance of the wireless device, avoiding the determined amount of impact; and/or scheduling one or more operational tasks of the wireless device to reduce the overlap with a time of interruption.

Embodiment 2: The method of embodiment 1, wherein the amount of impact comprises one or more interruption related parameters or metrics.

Embodiment 3: The method of any of embodiments 1 to 2, wherein the one or more interruption related parameters or metrics comprise at least one of an error rate, a loss of packets, a packet loss rate, a number of packets loss, a packet drop rate, a reduction in the detection probability, an increase of misdetection probability, or a probability of packets missed, dropped, or lost.

Embodiment 4: The method any of embodiments 1 to 3, wherein the amount of impact is determined based on at least one of a frequency distance between the first carrier and the second carrier, a frequency separation between the first carrier and the second carrier, a difference in a first SCS of the first carrier and a second SCS of the second carrier, a timing alignment between the first carrier and the second carrier, a first radio access technology (RAT) of the first carrier, or a second RAT of the second carrier.

Embodiment 5: The method of any of embodiments 1 to 4, further comprising performing one or more operational tasks based on the determined amount of impact; wherein the one or more operational tasks comprise at least one of determining an applicable radio resource management (RRM) requirement, determining performance of the wireless device while performing SRS switching, compensating for the determined amount of impact, adapting operation of the wireless device to reduce the amount of impact, avoiding the determined amount of impact, or scheduling operational tasks of the wireless device to reduce overlap with the first time resource.

Embodiment 6: The method of any of embodiments 1 to 5, wherein the first carrier is a current serving carrier.

Embodiment 7: The method of any of the previous embodiments, further comprising: providing user data; and forwarding the user data to a host computer via the transmission to the base station.

Group B Embodiments

Embodiment 8: A method performed by a base station for controlling sounding reference signal (SRS) switching impact, the method comprising: receiving a radio condition indicating SRS switching from a first carrier to a second carrier in a first time resource; and determining an amount of impact of the SRS switching for the first time resource; wherein at least one of the first carrier and the second carrier has a flexible subcarrier spacing (SCS).

Embodiment 8.1: The method of embodiment 8, wherein determining the amount of impact comprises receiving an indication of the amount of impact from a wireless device in communication with the base station.

Embodiment 8.2: The method of embodiments 8 and/or 8.1, further comprising utilizing the determined amount of impact to: determine performance of a wireless device when the wireless device is performing SRS switching, compensating for the determined impact; adapt a wireless device configuration or scheduling (e.g., of SRS switching, data transmissions to and/or from wireless device, wireless device measurements, etc.) to reduce the impact of SRS switching on wireless device performance; schedule base station operational tasks to reduce the overlap with the time of interruption; take a first action when the determined amount of impact is below a threshold and take it can take a second action otherwise; adapt a wireless device configuration or a configuration of signals of the wireless device (e.g., their periodicity) to be used by the wireless device so that the determined amount of impact is below a threshold when the wireless device is configured with SRS switching; select an SRS switching configuration for which the impact is below a threshold; and/or configure two SRS switching loops with a larger overlap (e.g. in different RATs or in different TAGs).

Embodiment 9: The method of embodiment 8, wherein the amount of impact comprises one or more interruption related parameters or metrics.

Embodiment 10: The method of any of embodiments 8 to 9, wherein the one or more interruption related parameters or metrics comprise at least one of an error rate, a loss of packets, a packet loss rate, a number of packets loss, a packet drop rate, a reduction in the detection probability, an increase of misdetection probability, or a probability of packets missed, dropped, or lost.

Embodiment 11: The method of any of embodiments 8 to 10, wherein the amount of impact is determined based on at least one of a frequency distance between the first carrier and the second carrier, a frequency separation between the first carrier and the second carrier, a difference in a first SCS of the first carrier and a second SCS of the second carrier, a timing alignment between the first carrier and the second carrier, a first radio access technology (RAT) of the first carrier, or a second RAT of the second carrier.

Embodiment 12: The method of any of embodiments 8 to 11, further comprising performing one or more operational tasks based on the determined amount of impact; wherein the one or more operational tasks comprise at least one of determining an applicable radio resource management (RRM) requirement for the wireless device, determining performance of the wireless device while performing SRS switching, compensating for the determined amount of impact, adapting configuration or scheduling of the wireless device to reduce the amount of impact, avoiding the determined amount of impact, or scheduling operational tasks of the wireless device to reduce overlap with the first time resource.

Embodiment 13: The method of any of embodiments 8 to 12, further comprising taking a first action when the amount of impact is below a threshold.

Embodiment 14: The method of any of embodiments 8 to 12, further comprising adapting at least one of a configuration of the wireless device or a configuration of signals of the base station such that the amount of impact is below a threshold during the first time resource.

Embodiment 15: The method of any of embodiments 8 to 12, further comprising configuring the SRS switching such that the amount of impact is below a threshold.

Embodiment 16: The method of any of embodiments 8 to 12, further comprising configuring two or more SRS switching loops with an overlap to reduce an overall impact of the two or more SRS switching loops.

Embodiment 17: The method of any of embodiments 8 to 16, wherein the first carrier is a current serving carrier.

Embodiment 18: The method of any of the previous embodiments, further comprising: obtaining user data; and forwarding the user data to a host computer or a wireless device.

Group C Embodiments

Embodiment 19: A wireless device for controlling sounding reference signal (SRS) switching impact, the wireless device comprising: processing circuitry configured to perform any of the steps of any of the Group A embodiments; and power supply circuitry configured to supply power to the wireless device.

Embodiment 20: A base station for controlling sounding reference signal (SRS) switching impact, the base station comprising: processing circuitry configured to perform any of the steps of any of the Group B embodiments; and power supply circuitry configured to supply power to the base station.

Embodiment 21: A User Equipment, UE, for controlling sounding reference signal (SRS) switching impact, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 22: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 23: The communication system of the previous embodiment further including the base station.

Embodiment 24: The communication system of the previous 2 embodiments, further including the UE, wherein the UE is configured to communicate with the base station.

Embodiment 25: The communication system of the previous 3 embodiments, wherein: the processing circuitry of the host computer is configured to execute a host application, thereby providing the user data; and the UE comprises processing circuitry configured to execute a client application associated with the host application.

Embodiment 26: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 27: The method of the previous embodiment, further comprising, at the base station, transmitting the user data.

Embodiment 28: The method of the previous 2 embodiments, wherein the user data is provided at the host computer by executing a host application, the method further comprising, at the UE, executing a client application associated with the host application.

Embodiment 29: A User Equipment, UE, configured to communicate with a base station, the UE comprising a radio interface and processing circuitry configured to perform the method of the previous 3 embodiments.

Embodiment 30: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 31: The communication system of the previous embodiment, wherein the cellular network further includes a base station configured to communicate with the UE.

Embodiment 32: The communication system of the previous 2 embodiments, wherein: the processing circuitry of the host computer is configured to execute a host application, thereby providing the user data; and the UE's processing circuitry is configured to execute a client application associated with the host application.

Embodiment 33: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 34: The method of the previous embodiment, further comprising at the UE, receiving the user data from the base station.

Embodiment 35: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 36: The communication system of the previous embodiment, further including the UE.

Embodiment 37: The communication system of the previous 2 embodiments, further including the base station, wherein the base station comprises a radio interface configured to communicate with the UE and a communication interface configured to forward to the host computer the user data carried by a transmission from the UE to the base station.

Embodiment 38: The communication system of the previous 3 embodiments, wherein: the processing circuitry of the host computer is configured to execute a host application; and the UE's processing circuitry is configured to execute a client application associated with the host application, thereby providing the user data.

Embodiment 39: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 40: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 41: The method of the previous embodiment, further comprising, at the UE, providing the user data to the base station.

Embodiment 42: The method of the previous 2 embodiments, further comprising: at the UE, executing a client application, thereby providing the user data to be transmitted; and at the host computer, executing a host application associated with the client application.

Embodiment 43: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 44: A communication system including a host computer comprising a communication interface configured to receive user data originating from a transmission from a User Equipment, UE, to a station, wherein the base station comprises a radio interface and processing circuitry, the base station's processing circuitry configured to perform any of the steps of any of the Group B embodiments.

Embodiment 45: The communication system of the previous embodiment further including the base station.

Embodiment 46: The communication system of the previous 2 embodiments, further including the UE, wherein the UE is configured to communicate with the base station.

Embodiment 47: The communication system of the previous 3 embodiments, wherein: the processing circuitry of the host computer is configured to execute a host application; and the UE is configured to execute a client application associated with the host application, thereby providing the user data to be received by the host computer.

Embodiment 48: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 49: The method of the previous embodiment, further comprising at the base station, receiving the user data from the UE.

Embodiment 50: The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

μs Microsecond
3GPP Third Generation Partnership Project
5G Fifth Generation
ACK Acknowledgement
AP Access Point
ASIC Application Specific Integrated Circuit
BS Base Station
BSC Base Station Controller
BWP Bandwidth Part
CA Carrier Aggregation
CC Component Carrier
CG Cell Group
CPU Central Processing Unit
D2D Device-to-Device
DAS Distributed Antenna System
DC Dual Connectivity
DL Downlink
DMRS Demodulation Reference Signal
DRX Discontinuous Reception
DSP Digital Signal Processor
eNB Enhanced or Evolved Node B
EN-DC Evolved Universal Terrestrial Radio Access New Radio Dual Connectivity
E-SMLC Evolved Serving Mobile Location Center
E-UTRA Evolved Universal Terrestrial Radio Access
FDD Frequency Division Duplexing
FPGA Field Programmable Gate Array
FR Frequency Range
GHz Gigahertz
gNB New Radio Base Station
kHz Kilohertz
LEE Laptop Embedded Equipment LME Laptop Mounted Equipment
LTE Long Term Evolution
M2M Machine-to-Machine
MCG Master Cell Group
MDT Minimization of Drive Tests
MeNB Master Enhanced or Evolved Node B
MgNG Master New Radio Base Station
MHz Megahertz
MME Mobility Management Entity
MN Master Node
MRTD Maximum Receive Timing Difference
ms Millisecond
MSC Mobile Switching Center
MSR Multi-Standard Radio
MTC Machine Type Communication
MTTD Maximum Uplink Transmission Timing Difference
NACK Negative Acknowledgement
NE-DC New Radio Evolved Universal Terrestrial Radio Access Dual Connectivity
ng-eNB Next Generation Enhanced or Evolved Node B
NN-DC New Radio New Radio Dual Connectivity
NR New Radio
O&M Operation and Maintenance
OFDM Orthogonal Frequency Division Multiplexing
OSS Operations Support System
OTT Over-the-Top
PCC Primary Component Carrier
PCell Primary Cell
PDA Personal Digital Assistant
PDSCH Physical Downlink Shared Channel
P-GW Packet Data Network Gateway
PRACH Physical Random Access Channel
ProSe Proximity Service
PSCell Primary Secondary Cell
psTAG Primary Secondary Timing Advance Group
pTAG Primary Timing Advance Group
PUCCH Physical Uplink Control Channel
PUSCH Physical Uplink Shared Channel
RAM Random Access Memory
RAN Radio Access Network
RAT Radio Access Technology
Rel Release
RLM Radio Link Monitoring
RNC Radio Network Controller
ROM Read Only Memory
RRH Remote Radio Head
RRM Radio Resource Management
RRU Remote Radio Unit
RX Reception
SCC Secondary Component Carrier
SCEF Service Capability Exposure Function
SCell Secondary Cell
SCG Secondary Cell Group
SCS Subcarrier Spacing
SeNB Secondary Enhanced or Evolved Node B
SgNB Secondary New Radio Base Station
SMTC Synchronization Signal/Physical Broadcasting Channel Block Measurement Timing Configuration
SN Secondary Node
SON Self-Organizing Network
SRS Sounding Reference Signal
SSB Synchronization Signal Block
SSF Short Subframe
sTAG Secondary Timing Advance Group
sTTI Short Transmission Time Interval
TA Timing Advance
TAG Timing Advance Group
TDD Time Division Duplexing
TRP Transmission Reception Point
TS Technical Specification
TTI Transmission Time Interval
TX Transmission
UE User Equipment
UL Uplink
USB Universal Serial Bus
V2V Vehicle-to-Vehicle
V2X Vehicle-to-Everything Those skilled in the art will recognize improvements and modifications to the embodiments of the present disclosure. All such improvements and modifications are considered within the scope of the concepts disclosed herein.

What is claimed is:

1. A method performed by a wireless device for controlling Sounding Reference Signal (SRS) switching impact, the method comprising:
   determining that there is an SRS carrier-based switching from a first carrier on which a first serving cell of the wireless device operates to a second carrier on which a second serving cell of the wireless device operates;
   determining an amount of impact that the SRS carrier-based switching from the first carrier on which the first serving cell of the wireless device operates to the second carrier on which the second serving cell of the wireless device operates has on one or more serving cells of the wireless device, wherein the amount of impact comprises one or more interruption related parameters or metrics and wherein determining the amount of impact is based on one or more of:
   a frequency separation between the first carrier and the second carrier,
   a first numerology of the first carrier,
   a second numerology of the second carrier,
   a timing alignment between the first carrier and the second carrier,
   a first radio access technology of the first carrier, and/or
   a second radio access technology of the second carrier; and
   utilizing the amount of impact that the SRS carrier-based switching has on the one or more serving cells of the wireless device.

2. The method of claim 1 wherein:
   the first serving cell of the wireless device is one of two or more cells in a first cell group of the wireless device;
   the second serving cell of the wireless device is one of two or more cells in a second cell group of the wireless device; and
   the one or more serving cells of the wireless device comprise:
   at least one of the two or more cells in the first cell group of the wireless device, other than the first serving cell; and/or
   at least one of the two or more cells in the second cell group of the wireless device, other than the second serving cell.

3. The method of claim 1 wherein at least one of the first carrier and the second carrier has a flexible subcarrier spacing.

4. The method of claim 1, wherein utilizing the amount of impact that the SRS carrier-based switching has on the one or more serving cells of the wireless device comprises:
   performing a first action when the amount of impact is below a threshold; and performing a second action when the amount of impact is not below the threshold.

5. The method of claim 1, wherein utilizing the amount of impact that the SRS carrier-based switching has on the one or more serving cells of the wireless device comprises utilizing the amount of impact to:
determine an applicable radio resource management requirement that the wireless device is required to meet;
determine a performance of the wireless device when the wireless device performs SRS carrier-based switching;
compensate for the amount of impact;
adapt operation of the wireless device to reduce the amount of impact of SRS carrier-based switching on performance of the wireless device; and/or
schedule one or more operational tasks of the wireless device to reduce an overlap between the one or more operational tasks and a time of interruption due to the amount of impact.

6. The method of claim 1, wherein utilizing the amount of impact that the SRS carrier-based switching has on the one or more serving cells of the wireless device comprises compensating for the amount of impact.

7. The method of claim 6 wherein compensating for the amount of impact comprises:
delaying a time for one or more operational tasks performed by the wireless device; and/or
extending a time used by the wireless device to perform one or more operational tasks.

8. The method of claim 1, wherein the one or more interruption related parameters or metrics comprise:
a duration of an interruption on the one or more serving cells as a result of the SRS carrier-based switching;
an error rate on the one or more serving cells as a result of the SRS carrier-based switching;
a number of lost packets on the one or more serving cells as a result of the SRS carrier-based switching;
a packet loss rate on the one or more serving cells as a result of the SRS carrier-based switching;
a packet drop rate on the one or more serving cells as a result of the SRS carrier-based switching;
a reduction in detection probability for packets on the one or more serving cells as a result of the SRS carrier-based switching;
an increase of misdetection probability for one of the one or more serving cells as a result of the SRS carrier-based switching; and/or
a probability of packets missed, dropped, or lost on the one or more serving cells as a result of the SRS carrier-based switching.

9. A wireless device for controlling Sound Reference Signal (SRS) switching impact, the wireless device comprising:
one or more transmitters;
one or more receivers; and
processing circuitry associated with the one or more transmitters and the one or more receivers, the processing circuitry configured to cause the wireless device to:
determine that there is an SRS carrier-based switching from a first carrier on which a first serving cell of the wireless device operates to a second carrier on which a second serving cell of the wireless device operates;
determine an amount of impact that the SRS carrier-based switching from the first carrier on which the first serving cell of the wireless device operates to the second carrier on which the second serving cell of the wireless device operates has on the one or more serving cells of the wireless device, wherein the amount of impact comprises one or more interruption related parameters or metrics and wherein determining the amount of impact is based on one or more of:
a frequency separation between the first carrier and the second carrier,
a first numerology of the first carrier,
a second numerology of the second carrier,
a timing alignment between the first carrier and the second carrier,
a first radio access technology of the first carrier, and/or
a second radio access technology of the second carrier; and
utilize the amount of impact that the SRS carrier-based switching has on the one or more serving cells of the wireless device.

10. A method performed by a base station for controlling Sounding Reference Signal (SRS) switching impact, the method comprising:
determining that there is a SRS carrier-based switching from a first carrier on which a first serving cell of a wireless device operates to a second carrier on which a second serving cell of the wireless device operates;
determining an amount of impact that the SRS carrier-based switching from the first carrier on which the first serving cell of the wireless device operates to the second carrier on which the second serving cell of the wireless device operates has on one or more serving cells of the wireless device, wherein the amount of impact comprises one or more interruption related parameters or metrics and wherein determining the amount of impact is based on one or more of:
a frequency separation between the first carrier and the second carrier,
a first numerology of the first carrier,
a second numerology of the second carrier,
a timing alignment between the first carrier and the second carrier,
a first radio access technology of the first carrier, and/or
a second radio access technology of the second carrier; and
utilizing the amount of impact that the SRS carrier-based switching has on the one or more serving cells of the wireless device.

11. The method of claim 10 wherein:
the first serving cell of the wireless device is one of two or more cells in a first cell group of the wireless device;
the second serving cell of the wireless device is one of two or more cells in a second cell group of the wireless device; and
the one or more serving cells of the wireless device comprise:
at least one of the two or more cells in the first cell group of the wireless device, other than the first serving cell; and/or
at least one of the two or more cells in the second cell group of the wireless device, other than the second serving cell.

12. The method of claim 10 wherein at least one of the first carrier and the second carrier has a flexible subcarrier spacing.

13. The method of claim 10, wherein determining the amount of impact that the SRS carrier-based switching from the first carrier on which the first serving cell of the wireless device operates to the second carrier on which the second serving cell of the wireless device operates has on one or more serving cells of the wireless device comprises receiving an indication of the amount of impact from the wireless device.

14. The method of claim 10, wherein utilizing the amount of impact that the SRS carrier-based switching has on the one or more serving cells of the wireless device comprises utilizing the amount of impact to:
  determine performance of the wireless device when the wireless device is performing SRS carrier-based switching;
  compensate for the determined impact;
  adapt a configuration or scheduling for the wireless device to reduce the amount of impact of SRS carrier-based switching on a performance of the wireless device;
  schedule one or more operational tasks of the base station to reduce an overlap between the one or more operational tasks and a time of interruption that results from the SRS carrier-based switching;
  take a first action when the determined amount of impact is below a threshold;
  take a second action when the determined amount of impact is above a threshold;
  adapt a configuration or a configuration of signals to be used by the wireless device so that the determined amount of impact is below a threshold when the wireless device is configured with SRS carrier-based switching;
  select an SRS switching configuration for which the determined amount of impact is below a threshold;
  configure two SRS switching loops with a larger overlap; or
  any combination thereof.

15. The method of claim 10, wherein the one or more interruption related parameters or metrics comprise:
  a duration of an interruption on the one or more serving cells as a result of the SRS carrier-based switching;
  an error rate on the one or more serving cells as a result of the SRS carrier-based switching;
  a number of lost packets on the one or more serving cells as a result of the SRS carrier-based switching;
  a packet loss rate on the one or more serving cells as a result of the SRS carrier-based switching;
  a packet drop rate on the one or more serving cells as a result of the SRS carrier-based switching;
  a reduction in detection probability for packets on the one or more serving cells as a result of the SRS carrier-based switching;
  an increase of misdetection probability for one of the one or more serving cells as a result of the SRS carrier-based switching;
  a probability of packets missed, dropped, or lost on the one or more serving cells as a result of the SRS carrier-based switching; or
  any combination thereof.

16. A base station comprising processing circuitry configured to cause the base station to:
  determine that there is a Sounding Reference Signal (SRS) carrier-based switching from a first carrier on which a first serving cell of a wireless device operates to a second carrier on which a second serving cell of the wireless device operates;
  determine an amount of impact that the SRS carrier-based switching from the first carrier on which the first serving cell of the wireless device operates to the second carrier on which the second serving cell of the wireless device operates has on one or more serving cells of the wireless device, wherein the amount of impact comprises one or more interruption related parameters or metrics and wherein determining the amount of impact is based on one or more of:
    a frequency separation between the first carrier and the second carrier,
    a first numerology of the first carrier,
    a second numerology of the second carrier,
    a timing alignment between the first carrier and the second carrier,
    a first radio access technology of the first carrier, and/or
    a second radio access technology of the second carrier; and
  utilize the amount of impact that the SRS carrier-based switching has on the one or more serving cells of the wireless device.

* * * * *